(12) United States Patent
Wang et al.

(10) Patent No.: US 12,377,403 B2
(45) Date of Patent: Aug. 5, 2025

(54) EFFICIENT AND SELECTIVE CONVERSION OF HIGH-DENSITY POLYETHYLENE INTO VALUABLE HYDROCARBONS

(71) Applicant: The Johns Hopkins University, Baltimore, MD (US)

(72) Inventors: Chao Wang, Baltimore, MD (US); Pengfei Xie, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 299 days.

(21) Appl. No.: 17/998,836

(22) PCT Filed: May 20, 2021

(86) PCT No.: PCT/US2021/033478
§ 371 (c)(1),
(2) Date: Nov. 15, 2022

(87) PCT Pub. No.: WO2021/236971
PCT Pub. Date: Nov. 25, 2021

(65) Prior Publication Data
US 2023/0211326 A1 Jul. 6, 2023

Related U.S. Application Data

(60) Provisional application No. 63/027,439, filed on May 20, 2020.

(51) Int. Cl.
*B01J 29/44* (2006.01)
*C10G 1/06* (2006.01)
(Continued)

(52) U.S. Cl.
CPC ............. *B01J 29/44* (2013.01); *C10G 1/06* (2013.01); *C10G 1/086* (2013.01); *C10G 1/10* (2013.01);
(Continued)

(58) Field of Classification Search
CPC . B01J 29/44; C10G 1/06; C10G 1/086; C10G 1/10; C10G 2300/1092;
(Continued)

(56) References Cited

U.S. PATENT DOCUMENTS

| 9,404,045 B2 | 8/2016 | Gaffney |
| 10,239,049 B2 | 3/2019 | Gaffney |

(Continued)

FOREIGN PATENT DOCUMENTS

| CN | 110639604 | 1/2020 |
| JP | 2005306974 A | 11/2005 |

(Continued)

OTHER PUBLICATIONS

WIPO Machine Translation of CN110639604. (Year: 2020).*
(Continued)

*Primary Examiner* — Brian A McCaig
(74) *Attorney, Agent, or Firm* — Casimir Jones, S.C.; Tristan A. Fuierer

(57) ABSTRACT

A highly active and selective solid catalyst comprising stable single-atom iridium (Ir) anchored in a zeolite, e.g., ZSM-5, for upcycling of plastics, such as high-density polyethylene, to yield valuable lower molecular weight hydrocarbon products is disclosed.

32 Claims, 25 Drawing Sheets

(51) Int. Cl.
 *C10G 1/08* (2006.01)
 *C10G 1/10* (2006.01)
(52) U.S. Cl.
 CPC .............. *C10G 2300/1092* (2013.01); *C10G 2300/202* (2013.01); *C10G 2300/4006* (2013.01); *C10G 2300/4012* (2013.01); *C10G 2300/70* (2013.01); *C10G 2400/30* (2013.01)
(58) Field of Classification Search
 CPC ...... C10G 2300/202; C10G 2300/4006; C10G 2300/4012; C10G 2300/70; C10G 2400/30
 See application file for complete search history.

(56) References Cited

U.S. PATENT DOCUMENTS

| | | |
|---|---|---|
| 2017/0072389 A1 | 3/2017 | Sharma et al. |
| 2020/0016581 A1 | 1/2020 | Gaffney |
| 2020/0078767 A1 | 3/2020 | Jantharasuk et al. |

FOREIGN PATENT DOCUMENTS

| | | |
|---|---|---|
| WO | WO 2017/083338 A1 | 5/2017 |
| WO | 2018127812 A1 | 7/2018 |
| WO | WO 2019/051101 | 3/2019 |

OTHER PUBLICATIONS

Van Gireken, R., et al., 2000, Microporous and Mesoporous Materials, 39, 135-147. (Year: 2000).*
International Search Report and Written Opinion for PCT/US21/33478. Mailed Sep. 23, 2021. 9 pages.
Achilias et al., Chemical recycling of plastic wastes made from polyethylene (LDPE and HDPE) and polypropylene (PP). J Hazard Mater. Nov. 19, 2007;149(3):536-42.
Aguado et al., Fuels from Waste Plastics by Thermal and Catalytic Processes: A Review. Ind Eng Chem Res. 2008; 47, 7982-7992.
Al-Dughaither et al., HZSM-5 Zeolites with Different SiO2/Al2O3 Ratios. Characterization and NH3 Desorption Kinetics. Ind Eng Chem Res. 2014; 53, 15303-15316.
Al-Salem et al., Techno-economic assessment of thermo-chemical treatment (TCT) units in the Greater London area. Chem Eng J. 2014; 248, 253-263.
Castano et al., Insights into the coke deposited on HZSM-5, H beta and HY zeolites during the cracking of polyethylene. Appl Catal B—Environ. 2011; 104, 91-100.
Celik et al., Upcycling Single-Use Polyethylene into High-Quality Liquid Products. ACS Cent Sci. Nov. 27, 2019;5(11):1795-1803.
Coonradt et al., Mechanism of Hydrocracking. Reactions of Paraffins and Olefins. Ind Eng Chem Proc Design and Develp. 1964. 3(1), 38-45.
Elordi et al., Role of pore structure in the deactivation of zeolites (HZSM-5, H beta and HY) by coke in the pyrolysis of polyethylene in a conical spouted bed reactor. Appl Catal B—Environ. 2011; 102, 224-231.
EPA, Advancing Sustainable Materials Management: 2017 Fact Sheet, https://www.epa.gov/facts-and-figures-about-materials-waste-and-recycling/plastics-material-specific-data (2019) Retrieved from the internet Dec. 22, 2022. 22 pages.
Fivga et al., Pyrolysis of plastic waste for production of heavy fuel substitute: A techno-economic assessment. Energy. 2018; 149, 865-874.
Gracida-Alvarez et al., System Analyses of High-Value Chemicals and Fuels from a Waste High-Density Polyethylene Refinery. Part 1: Conceptual Design and Techno-Economic Assessment. Acs Sustain Chem Eng. 2019, 7, 22, 18254-18266.
Gracida-Alvarez et al., System Analyses of High-Value Chemicals and Fuels from a Waste High-Density Polyethylene Refinery. Part 2: Carbon Footprint Analysis and Regional Electricity Effects. ACS Sustain Chem Eng 2019; 7, 18267-18278.
Guo et al., Direct, nonoxidative conversion of methane to ethylene, aromatics, and hydrogen. Science. May 9, 2014;344(6184):616-9.
Hernandez et al., Handbook of Energy Efficiency in Buildings: A Life Cycle Approach. Elsevier Inc., 2018. pp. 223-227.
Ibanez et al., Identification of the coke deposited on an HZSM-5 zeolite catalyst during the sequenced pyrolysis-cracking of HDPE. Appl Catal B-Environ. 2014; 148, 436-445.
Jia et al., Efficient and selective degradation of polyethylenes into liquid fuels and waxes under mild conditions. Sci Adv. Jun. 17, 2016;2(6):e1501591. 7 pages.
Kaminsky et al., Feedstock recycling of synthetic and natual rubber by pyrolysis in a fluidized bed. J Anal Appl Pyrol. 2009. 85, 334-337.
Kumara et al., A review on tertiary recycling of high-density polyethylene to fuel. Resour Conserv Recy. 2011. 55(11), 893-910.
Kunwar et al., Plastics to fuel: a review. Renew Sust Energ Rev. 2016. 54, 421-428.
Lin et al., In Situ Calorimetric Study: Structural Effects on Adsorption and Catalytic Performances for CO Oxidation over Ir-in-CeO2 and Ir-on-CeO2 Catalysts. J Phys Chem C. 2011. 115, 16509-16517.
Lonyi et al., On the interpretation of the NH3-TPD patterns of H-ZSM-5 and H-mordenite. Micropor Mesopor Mat. 2001. 47, 293-301.
Mills et al., Houdriforming Reactions—Catalytic Mechanism. Ind Eng Chem. 1953. 45, 1, 134-137.
Miskolczi et al., Fuels by pyrolysis of waste plastics from agricultural and packaging sectors in a pilot scale reactor. Fuel Process Technol. 2009. 90, 1032-1040.
Rahimi et al., Catalytic cracking of hydrocarbons over modified ZSM-5 zeolites to produce light olefins: A review. Appl Catal A—Gen. 2011. 398, 1-17.
Rahimi et al., Chemical recycling of waste plastics for new materials production. Nat Rev Chem. 2017. 1(6), 0046, 1-11.
Serrano et al., Developing Advanced Catalysts for the Conversion of Polyolefinic Waste Plastics into Fuels and Chemicals. ACS Catal 2012, 2, 1924-1941.
Songip et al., Test to Screen Catalysts for Reforming Heavy Oil from Waste Plastics. Appl Catal B—Environ, 1993;2:2-3. 153-164.
Verheyen et al., Molecular shape-selectivity of MFI zeolite nanosheets in n-decane isomerization and hydrocracking. J Catal. 2013, 300, 70-80.
Wang et al., Thermally stable Ir/Ce0.9La0.1O2 catalyst for high temperature methane dry reforming reaction. Nano Res, 2016, 10, 364-380.
Weisz et al., Stepwise Reaction on Separate Catalytic Centers—Isomerization of Saturated Hydrocarbons. Science. 1957, 126(3262), 31-32.
Weitkamp. Catalytic Hydrocracking-Mechanisms and Versatility of the Process. ChemCatChem. 2012. 4(3), 292-306.
Wong et al., Catalytic Cracking of LDPE Dissolved in Benzene Using Nickel-Impregnated Zeolites. Ind Eng Chem Res. 2016, 55(9), 2543-2555.
Xie et al., Nanoceria-Supported Single-Atom Platinum Catalysts for Direct Methane Conversion. ACS Catal. 2018. 8, 5, 4044-4048.
Xiong et al., Thermally Stable and Regenerable Platinum-Tin Clusters for Propane Dehydrogenation Prepared by Atom Trapping on Ceria. Angew Chem Int Edit. 2017, 56, 31, 8986-8991.
Yang et al., Metal-Organic Framework Nodes as Nearly Ideal Supports for Molecular Catalysts: NU-1000-and UiO-66-Supported Iridium Complexes. J Am Chem Soc. 2015. 137, 23, 7391-7396.
Yin et al., NH3 adsorption on the Bronsted and Lewis acid sites of V2O5(010): A periodic density functional study. J Phys Chem B. 1999, 103(22), 4701-4706.
Yu et al., The role of shape selectivity in catalytic fast pyrolysis of lignin with zeolite catalysts. Applied Catalysis A: General. 2012, vol. 447-448, 115-123.
Zhang et al., Dioxins and polyvinylchloride in combustion and fires. Waste Manag Res. Jul. 2015;33(7):630-43.
Zhang et al., Recovering waste plastics using shape-selective nanoscale reactors as catalysts. Nat Sustain 2, 2019. 39-42.

(56) References Cited

OTHER PUBLICATIONS

Partial Supplementary EP Search Report for EP21808333.5, mailed May 22, 2024, 12 pages.
Mihaylov et al., New Types of Nonclassical Iridium Carbonyls Formed in Ir-ZSM-5: A Fourier Transform Infrared Spectroscopy Investigation, Journal of Physical Chemistry Part B., vol. 110, No. 21, Jun. 1, 2006, pp. 10383-10389.
Office Action for Japanese Application No. 2022-571367, mailed Apr. 22, 2025, w/English Translation, 9 Pages.
Zhang H., "Catalytic Hydrocracking of HDPE Using Ir@ZSM-5", Johns Hopkins Libraries, Johns Hopkins University, May 11, 2020, 38 Pages, Retrieved from: https://jscholarship.library.jhu.edu/server/api/core/bitstreams/d6d66773-3861-4c29-91f8-3ed71d66642f/content.

* cited by examiner

HZSM-5                    Ir/ZSM-5

EFFICIENT AND SELECTIVE CONVERSION OF HIGH-DENSITY POLYETHYLENE INTO VALUABLE HYDROCARBONS

BACKGROUND

Plastics play an indispensable role in every aspect of modern life. The widespread use of large volumes of plastics, however, has created serious environmental issues, which demand proper end-of-life management of plastic waste. Each year, plastics account for approximately 30 million tons of municipal solid waste (MSW) in the United States, of which only 8.4% was recycled in 2017, Rahimi and Garcia, 2017; EPA, *Advancing Sustainable Materials Management:* 2017 *Fact Sheet,* 2019. These data indicate that there is great room for improvement in the recycling of plastic waste and highlight the potential of the plastic recycling industry to contribute significantly to the environment and to the global economy.

Despite significant efforts, 75.8% of recyclable plastics still end up in landfills in 2017. Once landfilled, materials are mixed with dirt and take hundreds of years to decompose. Aguado et al., 2008; Kunwar et al., 2016. The most usual alternative approach for the treatment of waste plastics is incineration with energy recovery. Serrano et al., 2012. This option, however, is often socially rejected because of the risk of emission of toxic compounds, such as dioxins and furans. Zhang et al, 2015. Nowadays, chemical recycling with energy recovery is considered as the more sustainable and suitable route, ideally with conversion into valuable liquid fuels or chemical feedstocks. The available processes (typically thermo pyrolysis), however, suffer from low energy efficiency (>500° C.) and lack of product control. Kunwar et al., 2016; Jia et al., 2016.

SUMMARY

In some aspects, the presently disclosed subject matter provides a catalyst comprising iridium and an HZSM-5 zeolite, wherein the catalyst comprises one or more single-atom iridium sites confined in the HZSM-5 zeolite. In certain aspects, the catalyst comprises an iridium loading of between about 0.05 wt % iridium to about 0.25 wt % of iridium.

In certain aspects, the catalyst is substantially free of iridium clusters or iridium ensembles. In more certain aspects, the catalyst is substantially free of iridium-iridium metal bonds. In particular aspects, the iridium bonds with one or more oxygen atoms in a lattice comprising the HZSM-5 zeolite. In more particular aspects, the catalyst has an average coordination number of oxygen atoms to iridium of about 4.21±0.47. In certain aspects, the HZSM-5 zeolite comprises a Si/Al ratio of about 11.5.

In other aspects, the presently disclosed subject matter provides a process for converting a plastic into one or more lower-molecular weight hydrocarbons, the process comprising: (a) providing a metal-exchanged zeolite catalyst; (b) contacting the plastic and catalyst in a fixed-bed flow reactor in a stream of hydrogen/nitrogen gas wherein the plastic and the catalyst are packed in one of a (i) mixed configuration; or (ii) layer-by-layer configuration; and (c) collecting the one or more lower-molecular weight hydrocarbons.

In certain aspects, the plastic comprises a thermoplastic. In particular aspects, the thermoplastic is selected from the group consisting of high-density polyethylene (HDPE), low-density polyethylene (LDPE), polypropylene (PP), polystyrene (PS), polyvinyl chloride (PVC), polyethylene terephthalate (PET), and mixtures thereof.

In certain aspects, the metal-exchanged zeolite comprises a transition metal. In particular aspects, the transition metal is selected from the group consisting of Ti, V, Cr, Mn, Fe, Co, Ni, Cu, Pt, Pd, Ir, Au, Ag, Ru, Rh, Re, Os, Mo, and W.

In certain aspects, the zeolite is selected from the group consisting of clinoptilolite, chabazite, phillipsite, mordenite, analcime, heulandite, natrolite, and stilbite. In particular aspects, the zeolite is selected from the group consisting of ZSM-5, SSZ-13, and mordenite.

In certain aspects, the plastic and the catalyst are packed in a mixed configuration and the one or more hydrocarbons comprise one or more $C_2$-$C_7$ hydrocarbons. In particular aspects, the one or more $C_2$-$C_7$ hydrocarbons comprise about 45% to about 55% $C_5$ hydrocarbons.

In other aspects, the plastic and the catalyst are packed in a layer-by-layer configuration and the one or more hydrocarbons comprise one or more $C_2$-$C_{10}$ hydrocarbons. In certain aspects, the one or more $C_2$-$C_{10}$ hydrocarbons comprise about 55% to about 65% $C_8$ hydrocarbons. In particular aspects, the $C_8$ hydrocarbons comprise about approximately 96% xylene and structural isomers thereof.

Certain aspects of the presently disclosed subject matter having been stated hereinabove, which are addressed in whole or in part by the presently disclosed subject matter, other aspects will become evident as the description proceeds when taken in connection with the accompanying Examples and Drawings as best described herein below.

BRIEF DESCRIPTION OF THE DRAWINGS

Figure 1:
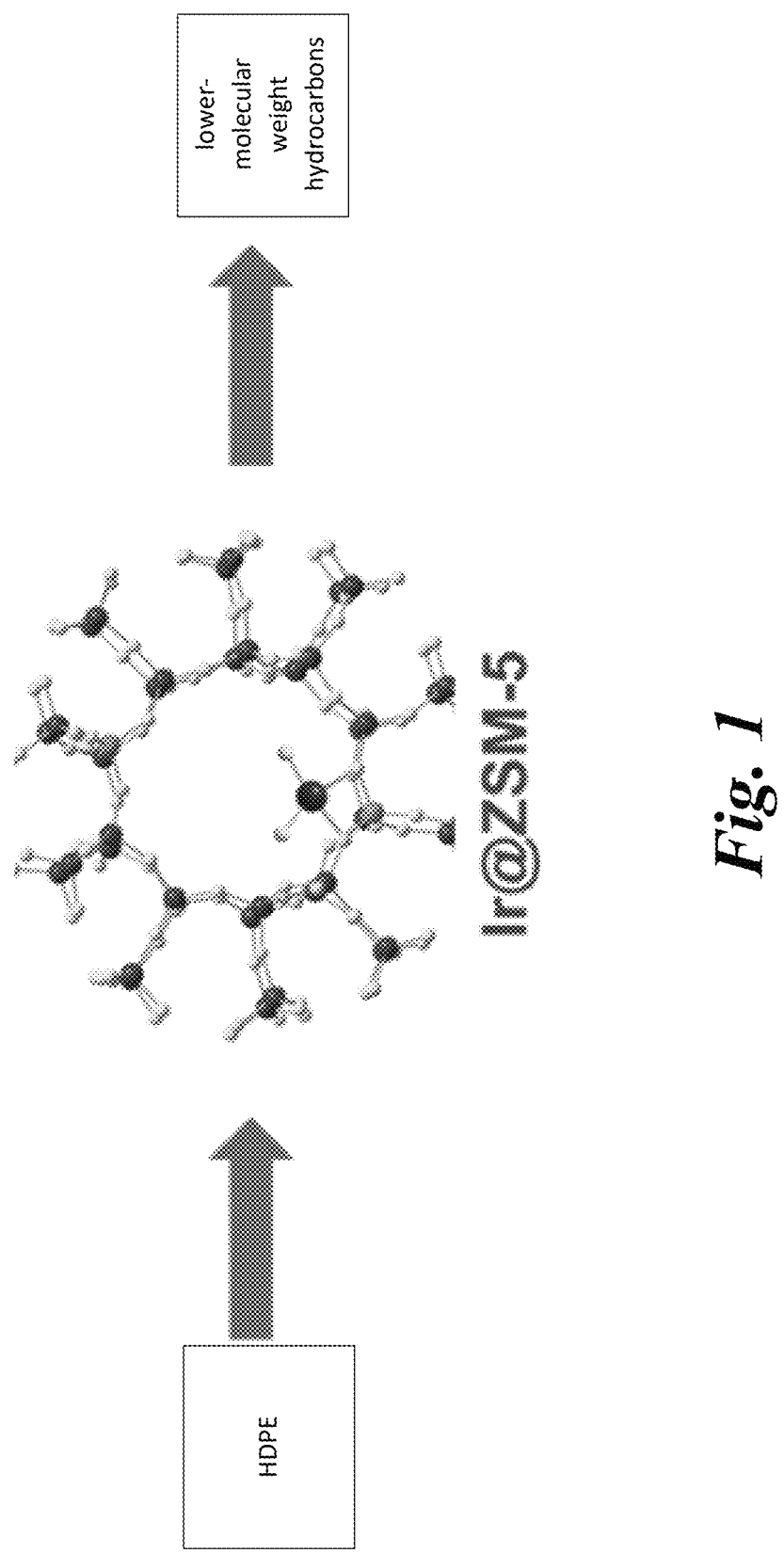
Figure 2:
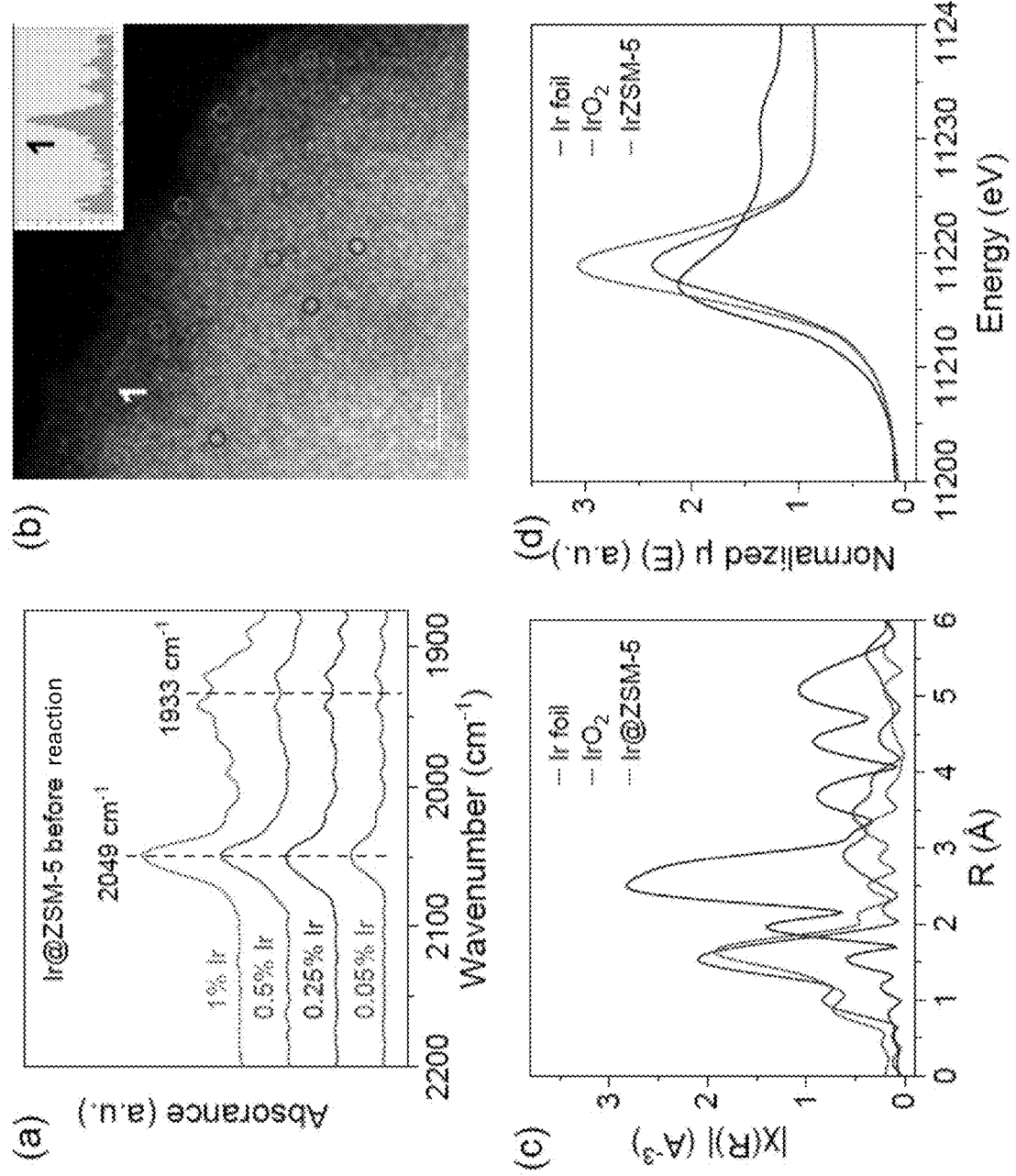

Having thus described the presently disclosed subject matter in general terms, reference will now be made to the accompanying Figures, which are not necessarily drawn to scale, and wherein:

FIG. 1 is a representative scheme of the catalytic cracking of high density polyethylene (HDPE) on Ir@ZSM-5 to hydrocarbon products with a selectivity of $C_8$ greater than 55%;

FIG. 2a, FIG. 2b, FIG. 2c, and FIG. 2d show the characterization of as-synthesized Ir@ZSM-5. (FIG. 2a) Diffuse reflectance infrared Fourier transform spectroscopy (DRIFTS) with CO chemisorption on Ir@ZSM-5 with different Ir loading; (FIG. 2b) Representative high-resolution HAADF-STEM images of 0.05 wt. % Ir@ZSM-5 catalyst. Inset: Intensity profile of the scans for the area marked 1; (FIG. 2c) Fourier transformed (FT) k2-weighted $\chi(k)$-function of the EXAFS spectra (FIG. 2c) and XANES spectra (FIG. 2d) for Ir $L_3$ edge of 0.05% Ir@ZSM-5, Ir foil and $IrO_2$ were used as reference;

FIG. 3a, FIG. 3b, FIG. 3c, and FIG. 3d show catalytic hydrocracking of HDPE evaluated at 36,000 mL g$^{-1}$ h$^{-1}$ with a packing configuration of mixing HDPE and the catalysts. (FIG. 3a) The selectivity of all the products and the conversions of HDPE at 350° C. as a function of Ir loading. (FIG. 3b) The yields of deposited coke and plastic residuals after reaction at 350° C. as a function of Ir loading. (FIG. 3c) The time-dependent conversion profiles determined for hydrocracking of HDPE over 0.25% Ir@ZSM-5 measured at different temperatures. (FIG. 3d) Product distribution measured for hydrocracking of HDPE over 0.25% Ir@ZSM-5 at different temperatures;

FIG. 4a, FIG. 4b, FIG. 4c, and FIG. 4d show catalytic hydrocracking of HDPE evaluated at 36,000 mL g$^{-1}$ h$^{-1}$ with the packing of the HDPE and catalyst layer-by-layer. (FIG. 4a) Comparison of the catalytic performance for 0.25%

Figure 6:
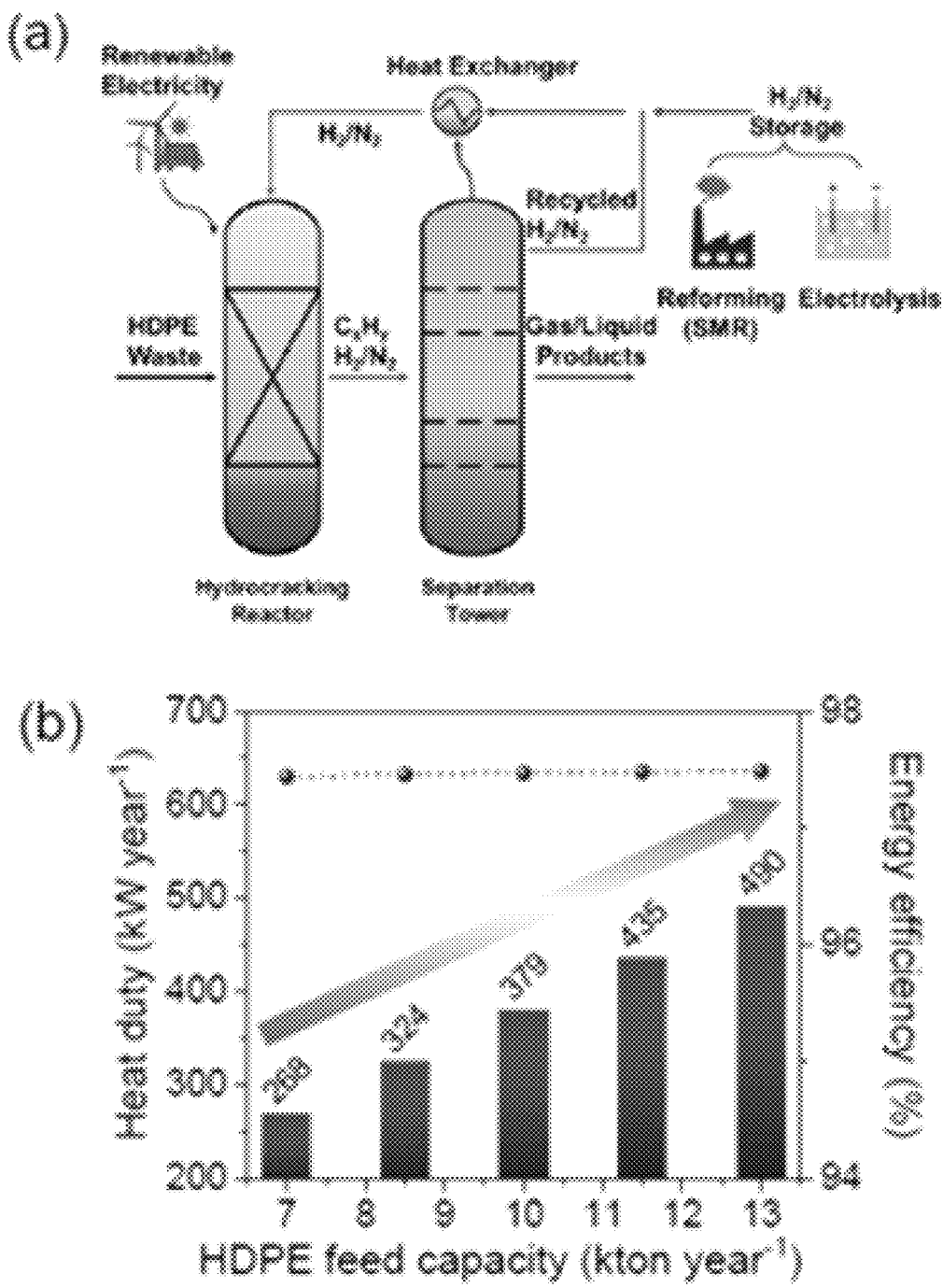
Figure 6:
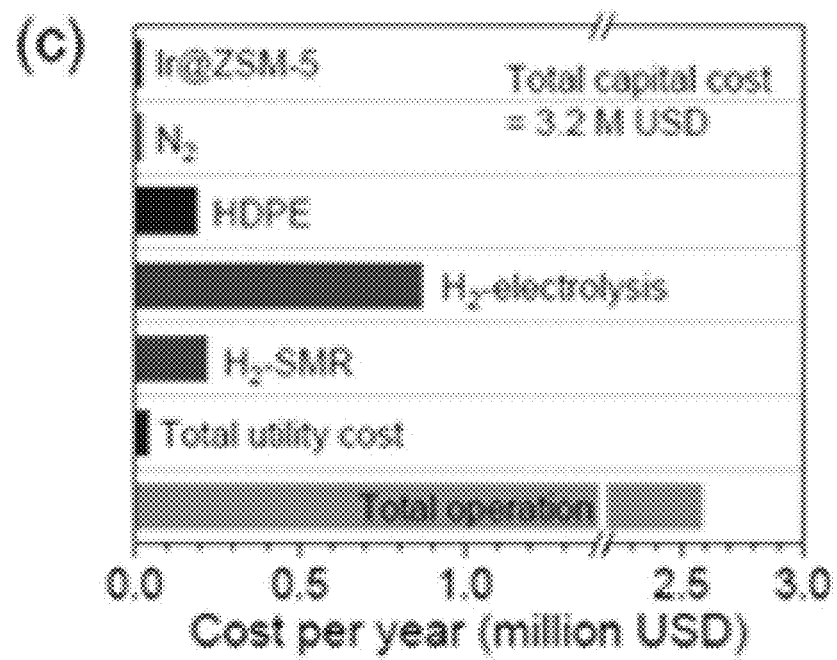
Figure 6:
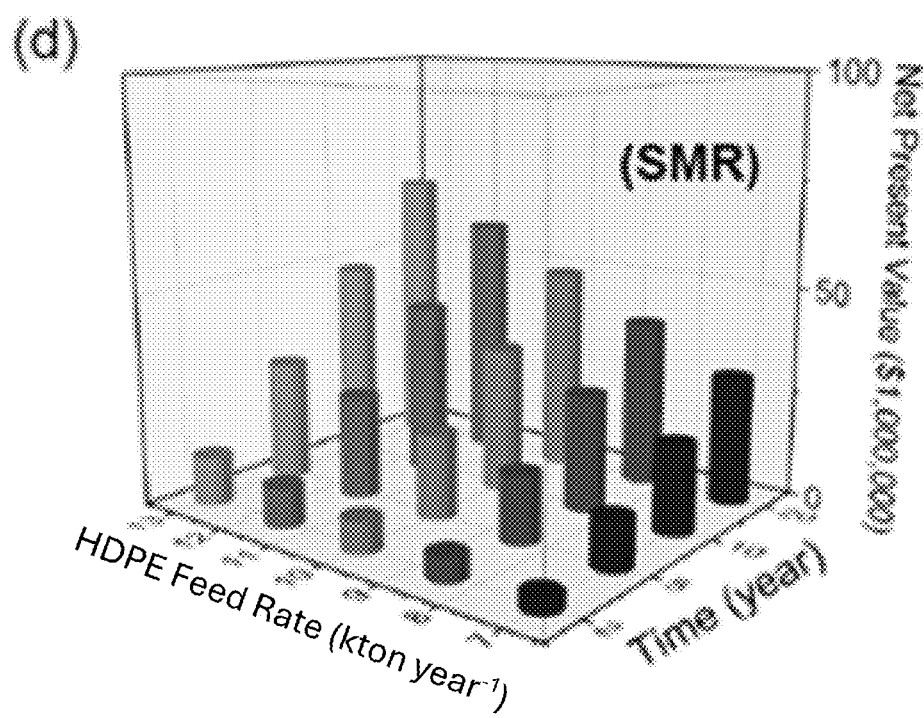
Figure 6:
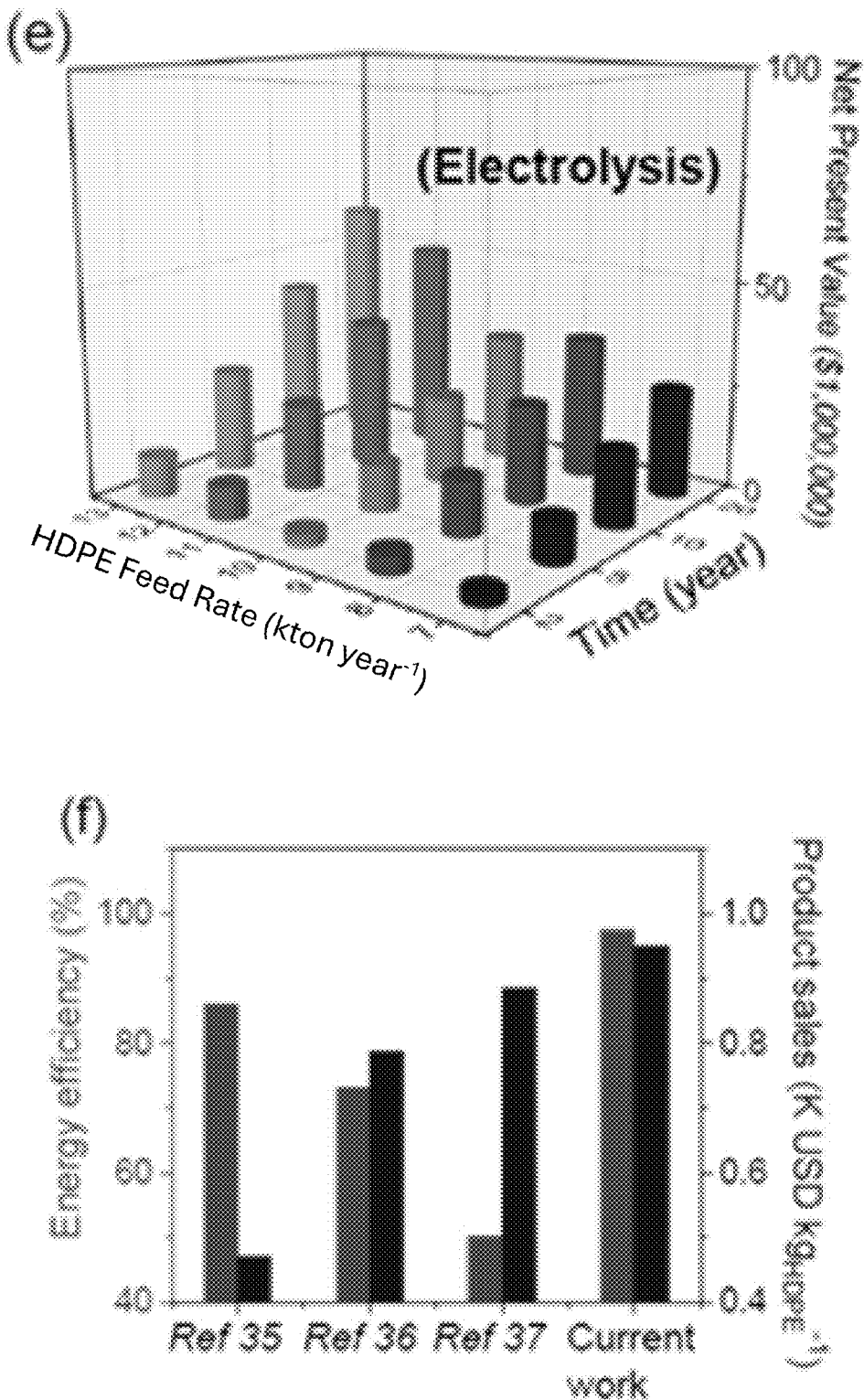
Figure 7:
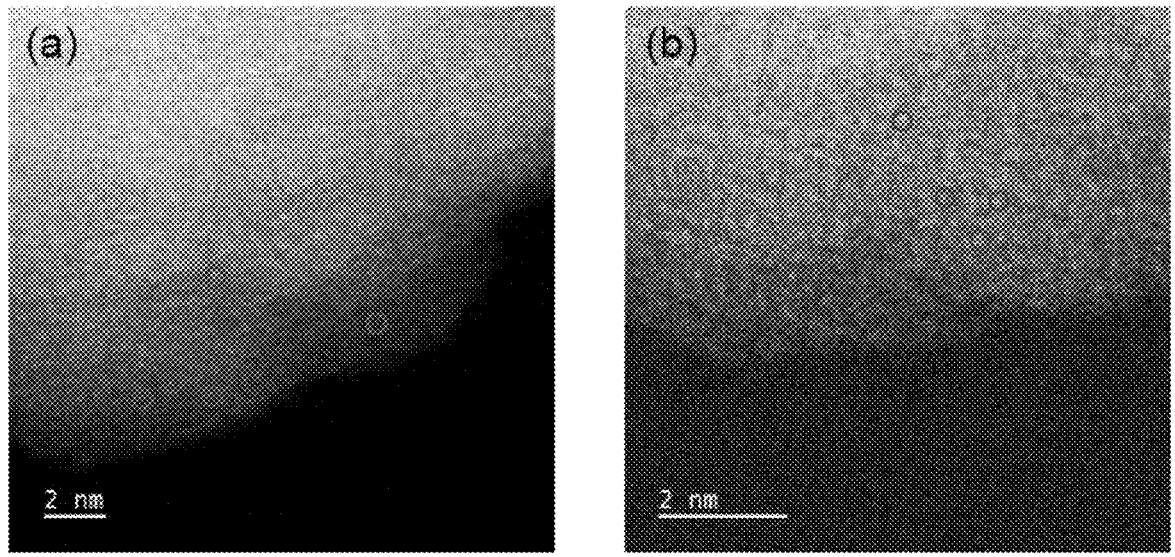
Figure 8:
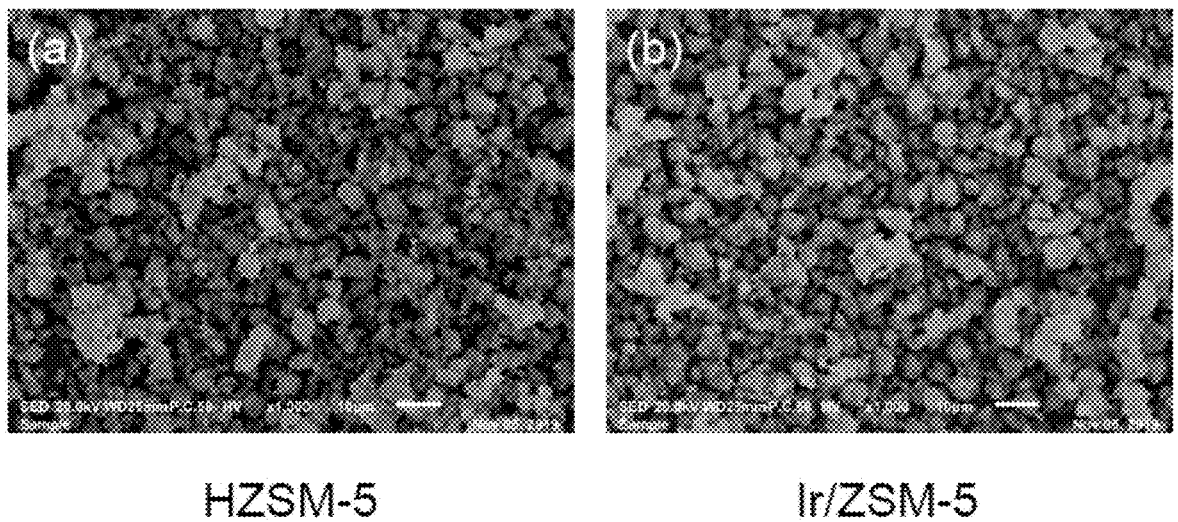
Figure 9:
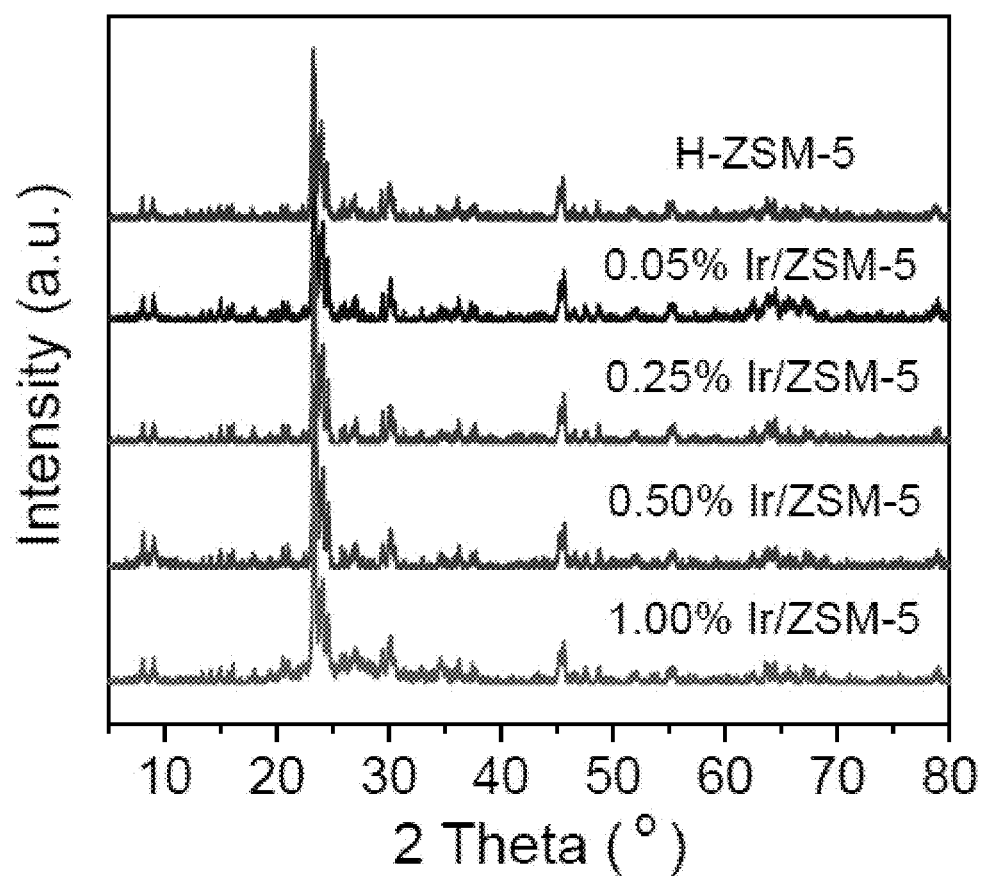
Figure 10:
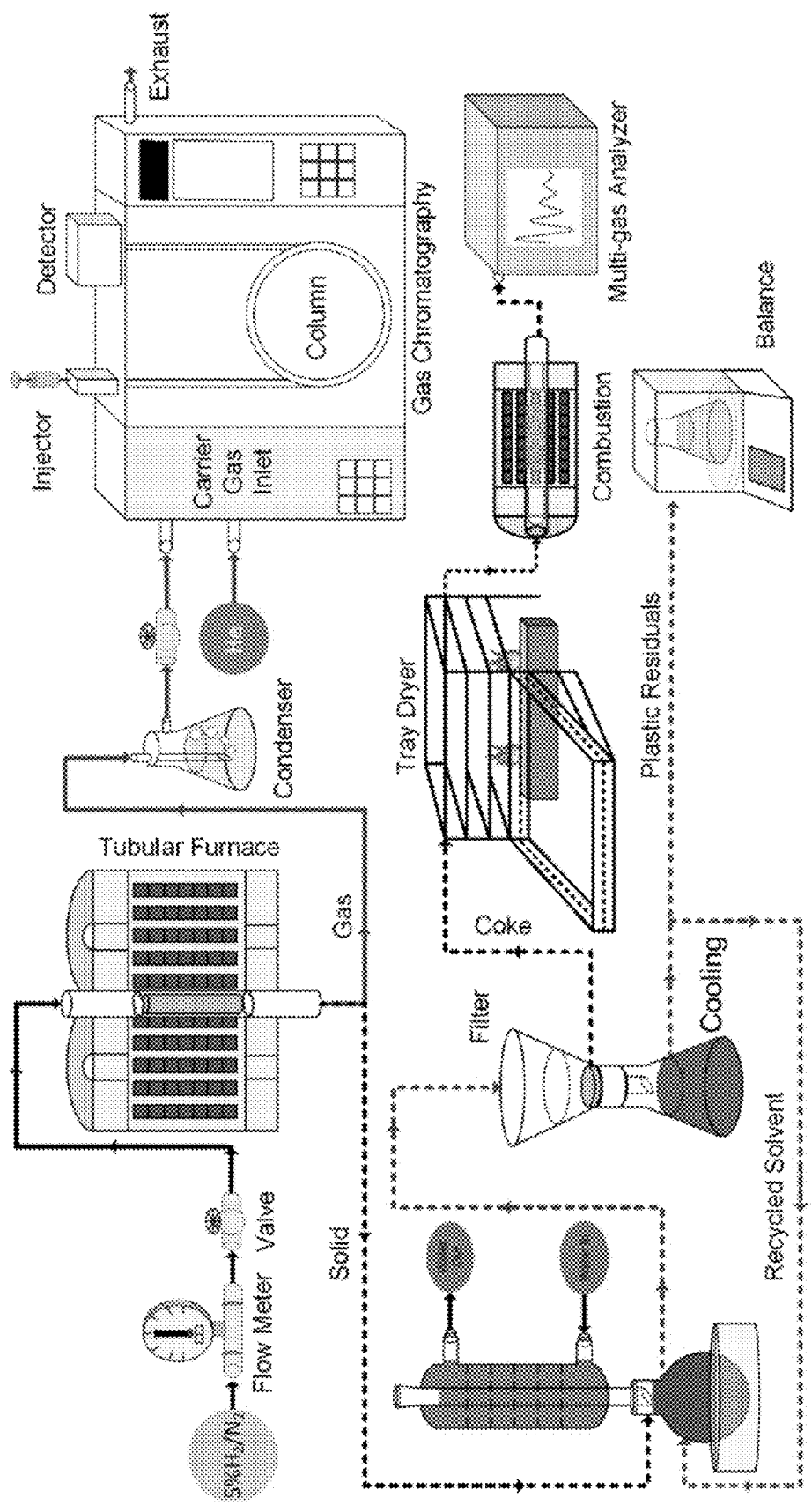
Figure 11:
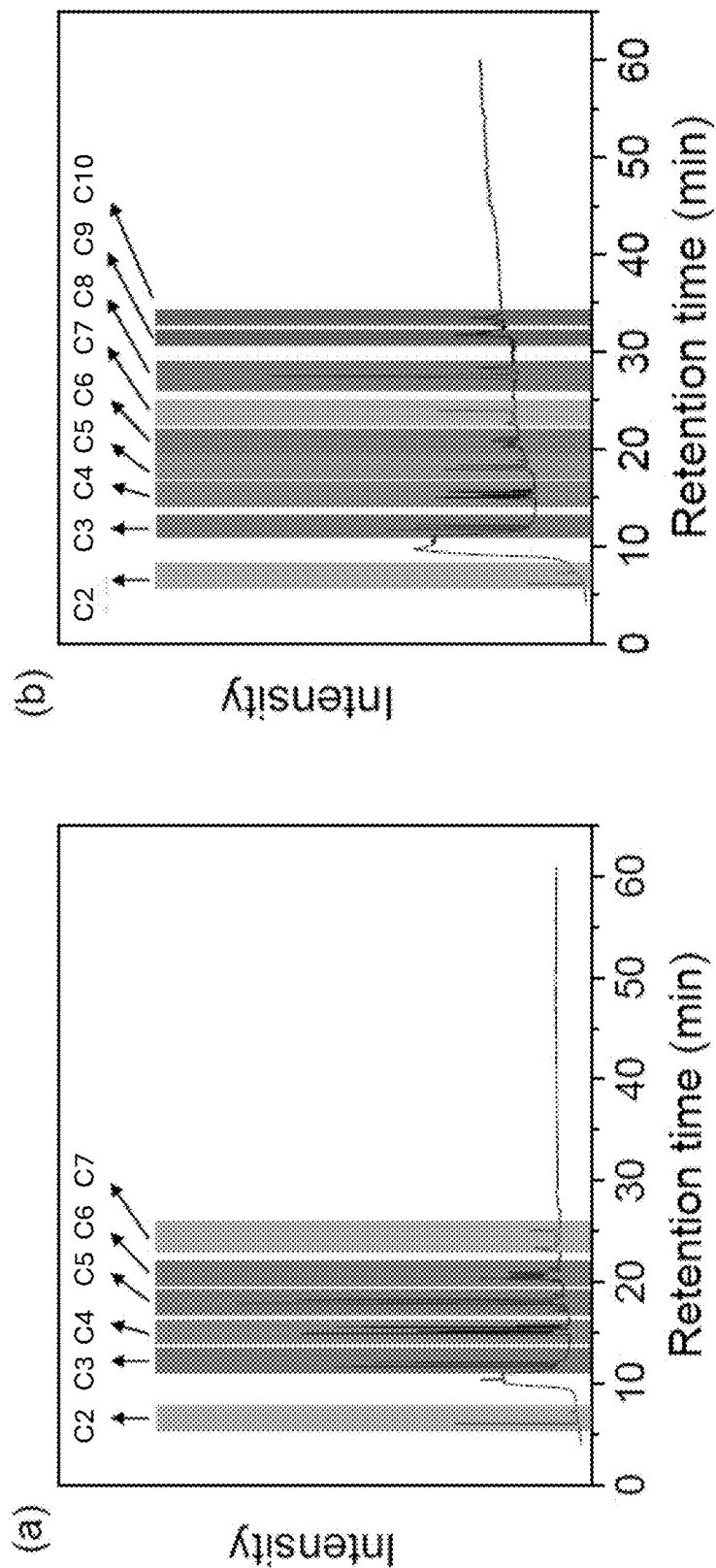
Figure 12:
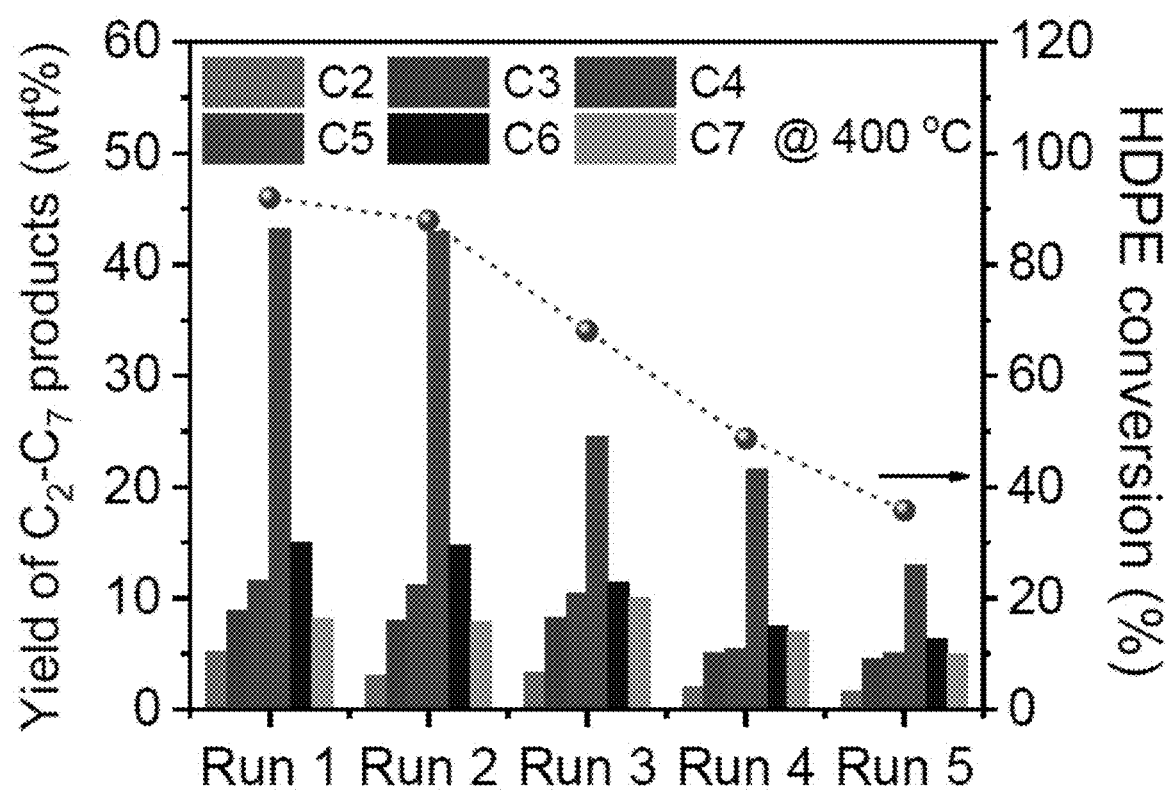
Figure 13:
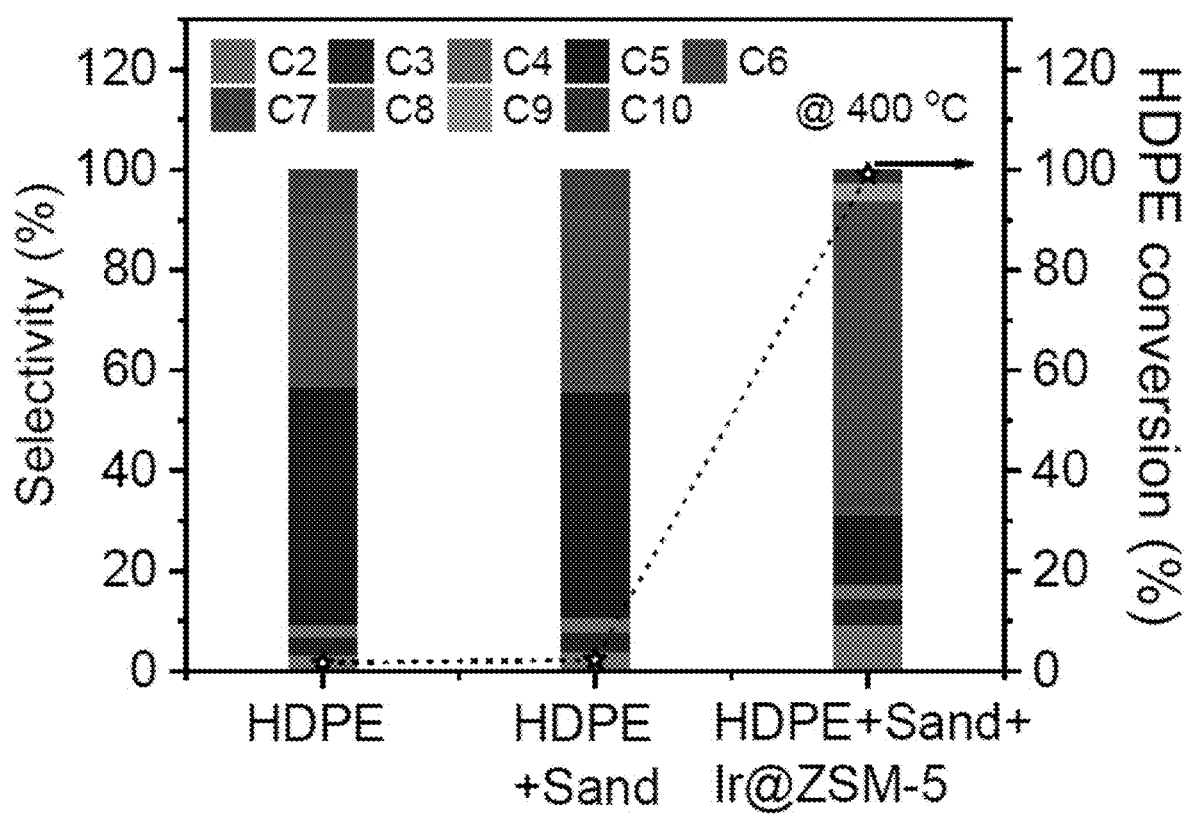
Figure 15:
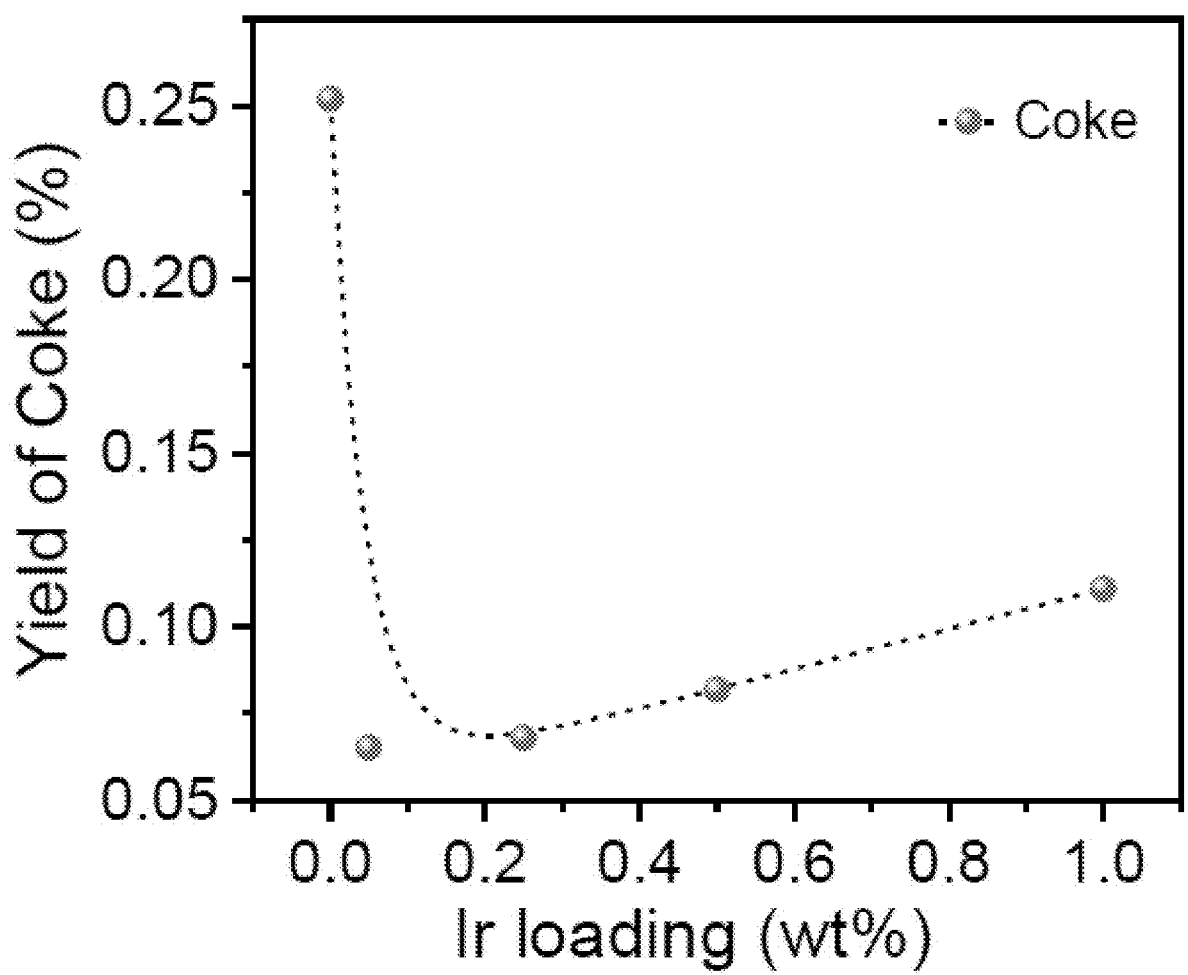
Figure 16:
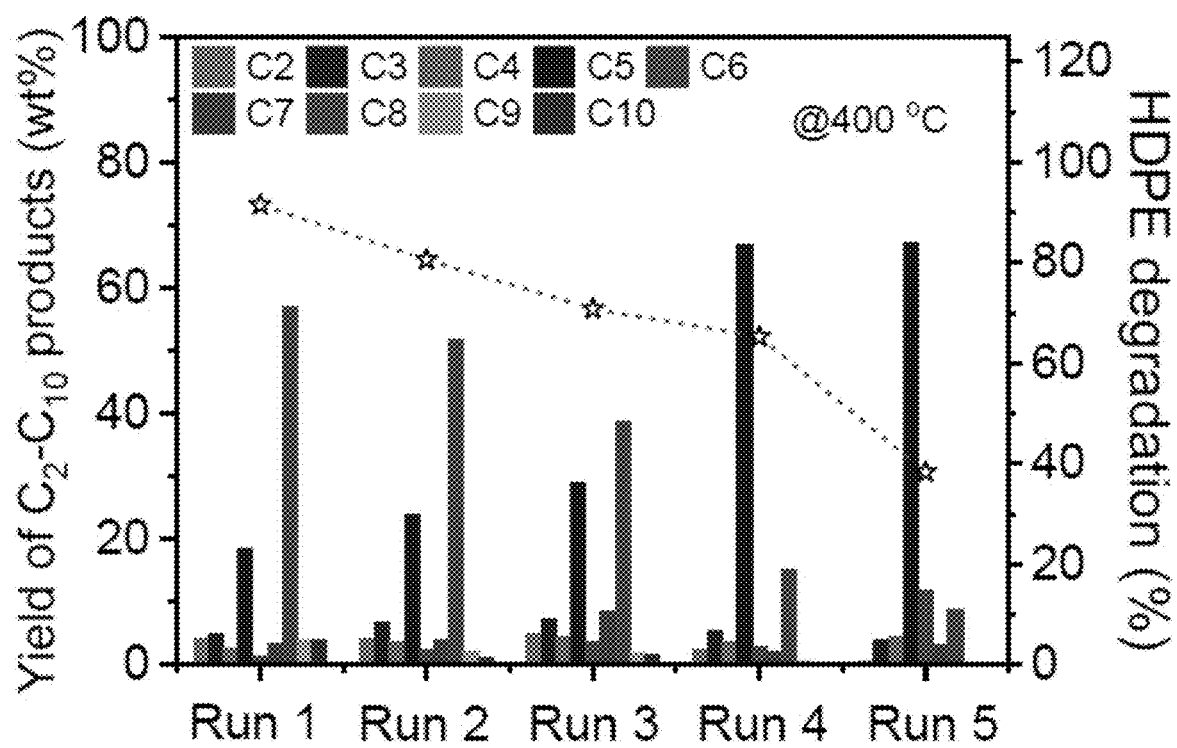
Figure 17:
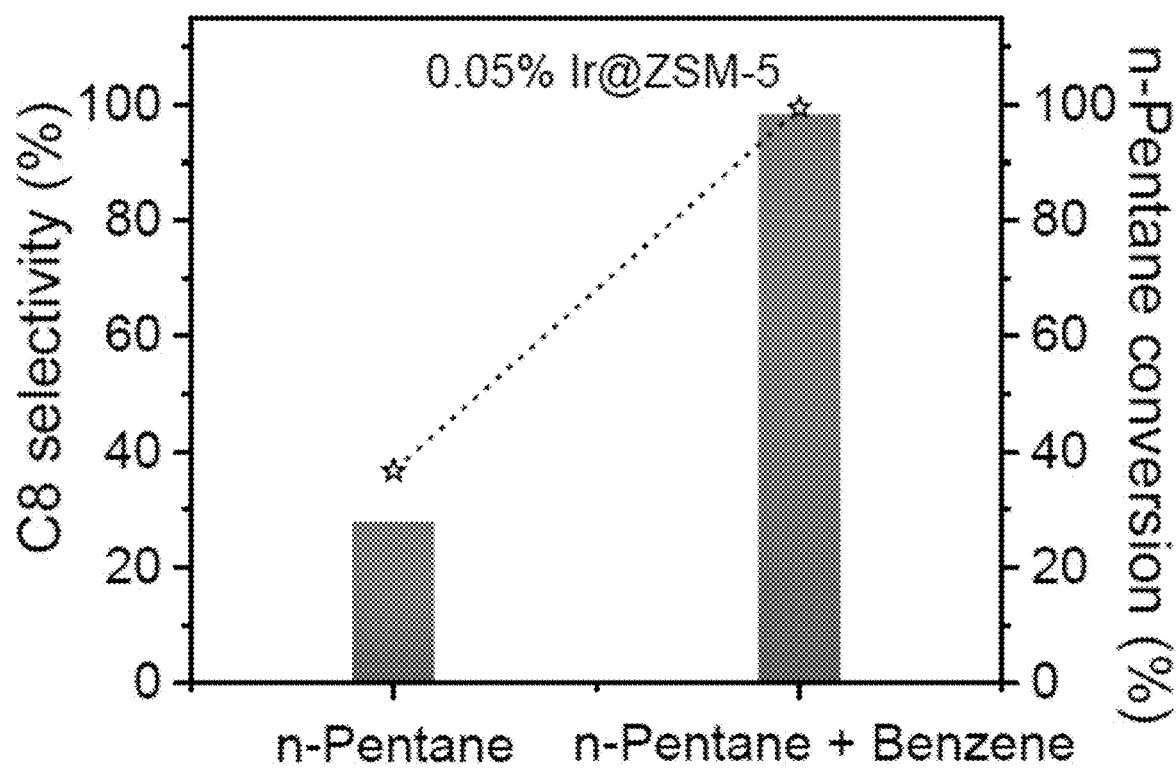
Figure 18:
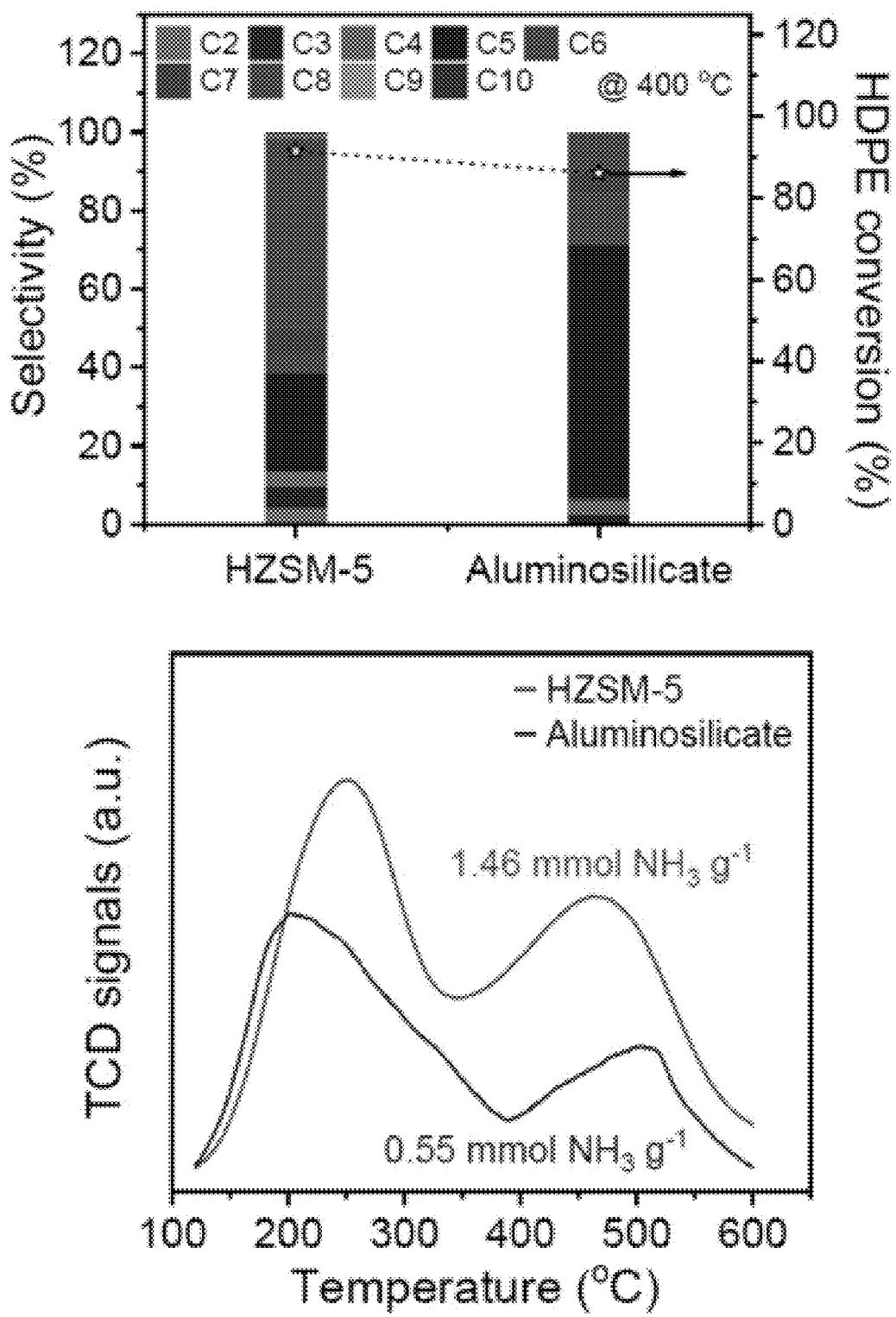
Figure 19:
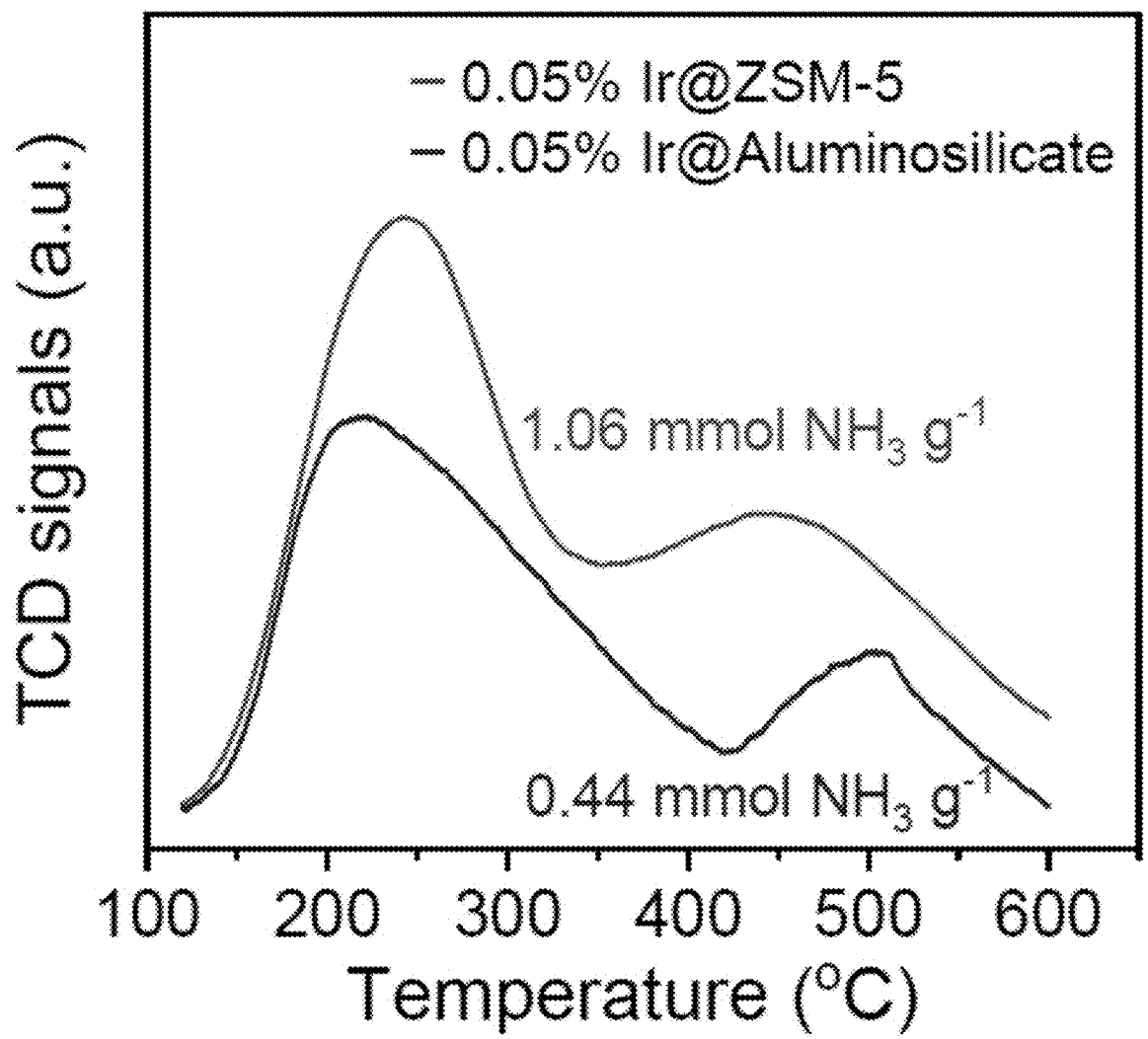
Figure 20:
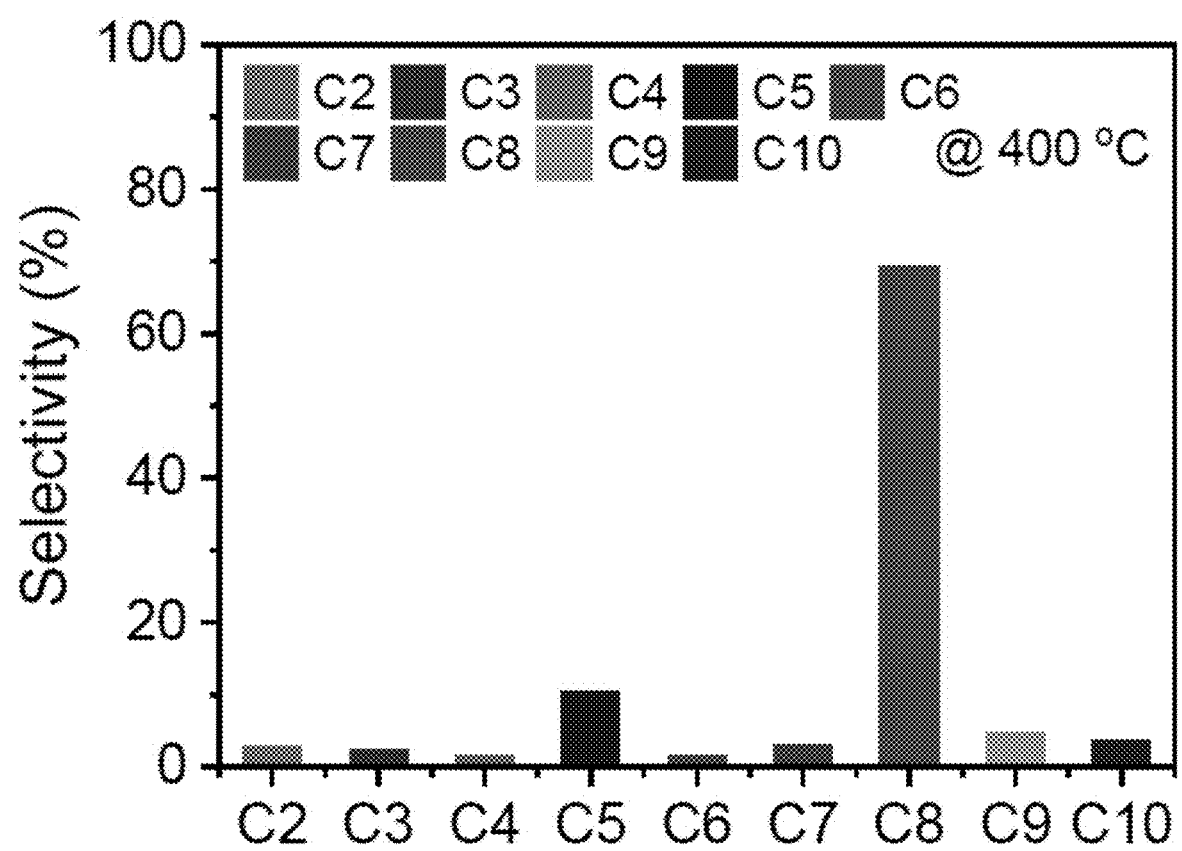
Figure 21:
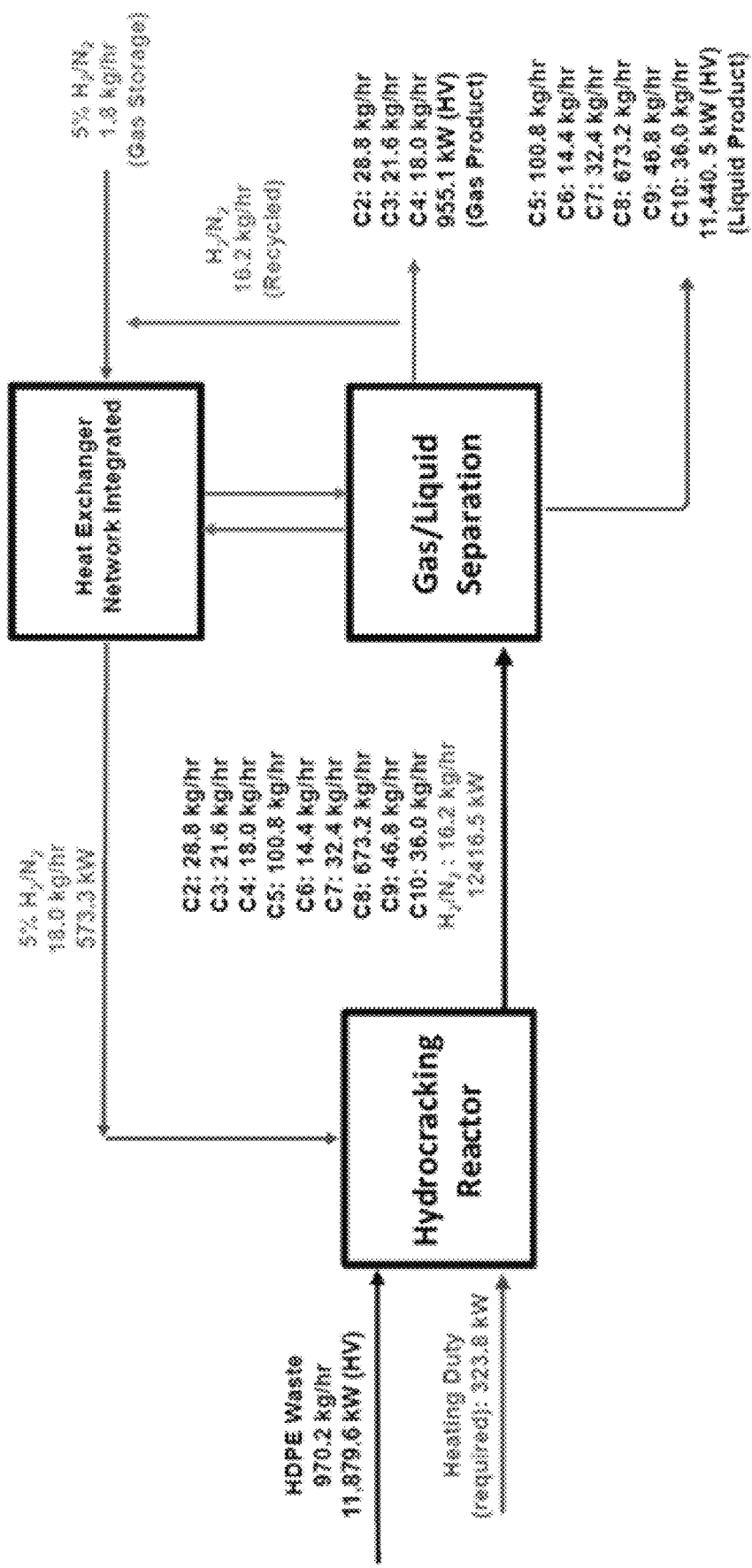

Ir@ZSM-5 measured by two different configurations of packing the HDPE and catalyst; (FIG. 4b) The time-dependent conversion profiles determined for hydrocracking of HDPE over all the catalysts measured at 400° C.; (FIG. 4c) The selectivity of all the products and the conversions of HDPE at 400° C. as a function of Ir loading; (FIG. 4d) Durability of 0.05% Ir@ZSM-5 by running 5 cycles for the catalytic hydrocracking of HDPE at 400° C.;

FIG. 5a, FIG. 5b, FIG. 5c, FIG. 5d, and FIG. 5e illustrate mechanistic and kinetic studies. (FIG. 5a) Proposed mechanism for the catalytic hydrocracking of HDPE on Ir@ZSM-5; (FIG. 5b) $NH_3$-TPD profiles of HZSM-5 and Ir@ZSM-5 with various Ir loadings; (FIG. 5c) $H_2$-TPR profiles of HZSM-5 and Ir@ZSM-5 with various Ir loading; (FIG. 5d) Correlation the HDPE conversions measured at 45 min with the acid densities (derived from the quantitation of desorbed $NH_3$ amount from $NH_3$-TPD) and Ir loadings (determined from the quantitation of $H_2$ consumption from $H_2$-TPR); (FIG. 5e) The selectivity of all the products and the conversions of HDPE at 400° C. for 0.05% Ir@ZSM-5 and 0.05% Ir/aluminosilicate;

FIG. 6a, FIG. 6b, FIG. 6c, FIG. 6d, FIG. 6e, and FIG. 6f illustrate a techno-economic assessment. (FIG. 6a) A schematic of the presently disclosed system of HDPE hydrocracking catalyzed by 0.05% Ir@ZSM-5 conducted in fluidized reactor at 400° C. (FIG. 6b) The dependences of heat duty and energy efficiency on HDPE feeding capacity. (FIG. 6c) Costs at the HDPE capacity of 8500 metric ton per year for the raw materials, total utility, total operation each year. The capital cost invested at the initial period also is present. The Net Present Values estimated for the HDPE hydrocracking catalyzed by 0.05% Ir@ZSM-5 with two $H_2$ sources generated by steam methane reforming (FIG. 6d) and electrolysis of water (FIG. 6e). (FIG. 6f) Comparison the energy efficiency and product sales each year with the literatures;

FIG. 7a and FIG. 7b are high-resolution HAADF-STEM images of the presently disclosed 0.05 Ir@ZSM-5 catalyst;

FIG. 8a and FIG. 8b are SEM images of HZSM-5 (FIG. 8a) and 0.05 Ir@ZSM-5 (FIG. 8b);

FIG. 9 shows XRD patterns of HZSM-5 and Ir@ZSM-5 with Ir loadings of 0.05%, 0.25%, 0.50%, and 1.00%;

FIG. 10 is a schematic diagram of the presently disclosed process for the catalytic hydrocracking of HDPE in presence of $H_2$, including analytical measurements to elucidate performance characteristics of the process under various reaction conditions;

FIG. 11a and FIG. 11b are representative profiles of GC results with a retention time of 1 h measured by two different packing configurations of the HDPE and catalyst: mixing configuration (FIG. 11a) and layer-by-layer configuration (FIG. 11b);

FIG. 12 shows the durability of 0.25% Ir@ZSM-5 by running 5 cycles for the catalytic hydrocracking of HDPE at 400° C. measured in the mixing configuration;

FIG. 13 illustrates the selectivity of products and HDPE conversion measured at 400° C. for two control experiments in the presence of 5% $H_2$: the hydrocracking of (1) HDPE, (2) HDPE and acid-washed sands, compared to the catalytic performance of (3) 0.05% Ir@ZSM-5 for the catalytic hydrocracking of HDPE;

FIG. 14a and FIG. 14b show the catalytic hydrocracking of HDPE evaluated at 36,000 mL $g^{-1}$ $h^{-1}$ with the packing of the HDPE and catalyst layer-by-layer. (FIG. 14a) The selectivity of all the products and the conversions of HDPE at 400° C. on the two loadings of 0.05% Ir@ZSM-5. (FIG. 14b) The time-dependent conversion profiles determined for hydrocracking of HDPE measured for the two different loadings of 0.05% Ir@ZSM-5 at 400° C.;

FIG. 15 shows the yields of deposited coke after the catalytic hydrocracking of HDPE at 400° C. measured in the mixing configuration as a function of Ir loading;

FIG. 16 demonstrates the durability of HZSM-5 by running 5 cycles for the catalytic hydrocracking of HDPE at 400° C. measured in the layer-by-layer configuration;

FIG. 17 demonstrates the selectivity of $C_8$ hydrocarbons and n-pentane conversion on 0.05% Ir@ZSM-5 for the hydrocracking of n-pentane and n-pentane+benzene in presence of 5% $H_2$ balanced by $N_2$;

FIG. 18a and FIG. 18b show (FIG. 18a) the selectivity of all the hydrocarbon products and the conversions of HDPE at 400° C. for HZSM-5 and aluminosilicate as the control sample. (FIG. 18b) $NH_3$-TPD profiles of HZSM-5 and aluminosilicate, the desorbed $NH_3$ amount also was quantified;

FIG. 19 shows $NH_3$-TPD profiles of 0.05% Ir@ZSM-5 and 0.05% Ir/aluminosilicate, the desorbed $NH_3$ amount also was quantified;

FIG. 20 shows product distribution of HDPE hydrocracking over 0.05% Ir@ZSM-5 simulated in an Aspen HYSYS yield shift reactor;

FIG. 21 is a summary of mass and energy balances for HDPE hydrocracking with a feeding rate of 8,500 metric ton per year catalyzed by 0.05% Ir@ZSM-5;

FIG. 22a, FIG. 22b, FIG. 22c, and FIG. 22d show a comparison of the cost for the raw material, total utility, and total operation each year. The capital cost invested at the initial period also is present at the HDPE feed capacity of 7000 (FIG. 22a), 10000 (FIG. 22b), 11500 (FIG. 22c) and 13000 (FIG. 22d) metric ton per year; and FIG. 23a and FIG. 23b shows that the investors' return rate (IRR) depended on the HDPE feeding capacity and manufacturing time with $H_2$ derived from steam methane reforming (FIG. 23a) and electrolysis of water (FIG. 23b).

DETAILED DESCRIPTION

The presently disclosed subject matter now will be described more fully hereinafter with reference to the accompanying Figures, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

I. Efficient and Selective Conversion of High Density Polyethylene into Valuable Hydrocarbons The presently disclosed subject matter provides a highly active and selective solid catalyst comprising stable single-atom iridium (Ir) anchored in a zeolite, e.g., ZSM-5, for upcycling of plastics, such as high-density polyethylene, to yield valuable lower molecular weight hydrocarbon products, which in some embodiments, are dominated by $C_8$ hydrocarbons.

More particularly, the presently disclosed subject matter provides a catalyst comprising iridium and an HZSM-5 zeolite, wherein the catalyst comprises one or more single-atom iridium sites confined in the HZSM-5 zeolite.

As used herein, a "zeolite" is a hydrated aluminosilicate mineral made from interlinked tetrahedra of alumina ($AlO_4$) and silica ($SiO_4$). Zeolites are characterized by having crystalline aluminosilicate three-dimensional structures arising from a framework of $[SiO_4]^{4-}$ and $[AlO_4]^{5-}$ coordination polyhedra linked through their corner. Zeolites can form with many different crystalline structures, which have open pores (sometimes referred to as cavities or channels) in a very regular arrangement and roughly the same size as small molecules. Zeolites generally have utility as catalysts for a variety of chemical reactions.

Synthetic zeolites have been designed for specific purposes, including as petroleum catalysts. One such example is ZSM-5, which is a Mordenite Framework Inverted (MF) type zeolite. Further, ZSM-5 is an aluminosilicate zeolite belonging to the pentasil family of zeolites having the chemical formula is $Na_nAl_nSi_{96-n}O_{192} \cdot 16H_2O$ (0<n<27). Representative zeolites suitable for use as catalysts include, but are not limited to, chabazite, erionite, faujasite, ferrierite, mordenite, offretite, TEA-mordenite, zeolite A, zeolite beta, zeolite boron beta, zeolite L, zeolite X, zeolite Y, zeolite ZK-5, Breck-6, HZSM-5, ITQ-1, ITQ-21, MCM-22, MCM-36, MCM-39, MCM-41, MCM-48, PSH-3, SUZ-4, EU-1, SAPO-5, SAPO-11, SAPO-34, (S)AlPO-31, SSZ-23, SSZ-32, TUD-1, VPI-5, ZSM-4, ZSM-5, ZSM-8, ZSM-11, ZSM-12, ZSM-20, ZSM-21, ZSM-22, ZSM-23, ZSM-34, ZSM-35, ZSM-38, ZSM-48, ZSM-50, and ZSM-57. In particular embodiments of the presently disclosed subject matter the zeolite is ZSM-5.

ZSM-5 catalysts generally comprise one or more acidic sites. Such catalysts can comprise one or more acidic sites. In general, the ZSM-5 can be ion exchanged with a desired cation to replace alkali metal present in the zeolite as prepared, thus obtain more acid sites. The preferred proton source is ammonium chloride/nitrate as opposed to acids, such as hydrochloric acid, sulfuric acid and nitric acid. Ion exchange is suitably accomplished by conventional contact of the zeolite with an aqueous solution of the proton source.

Zeolite catalysts also can be loaded or doped with Group VIII metals to facilitate secondary functions, such as dehydrogenation/hydrogenation or hydrogenolysis, in addition to the basic cracking reaction. Representative Group VIII metals include platinum, palladium, silver, gold, rhodium, ruthenium, and iridium. In particular embodiments of the presently disclosed subject matter the noble metal is iridium.

The Group VIII metal can be added to the zeolite by known methods in the art including incipient wetness impregnation: wet impregnation; deposition methods including physical, chemical, vapor and atomic deposition means; ion-exchanging and other synthetic means well known in the art. The Group VIII metal may be in the form of readily available compounds such as the metal salts with counter-anions such as nitrates, acetates, halides, oxy-halides, sulfates, nitrides, sulfides and the like.

Accordingly, in some embodiments, the catalyst comprises an iridium loading of between about 0.05 wt % iridium to about 1.0 wt % of iridium, including 0.05, 0.1, 0.15, 0.20, 0.25, 0.3, 0.4, 0.5, 0.6, 0.7, 0.8, 0.9 and 1 wt % iridium. In certain embodiments, the catalyst comprises an iridium loading of between about 0.05 wt % and about 0.25 wt %, including about 0.05, 0.1, 0.15, 0.20, and 0.25 wt % iridium. In particular embodiments, the catalyst comprises an iridium loading selected from the group consisting of 0.05 wt % and 0.25 wt %.

In some embodiments, the catalyst is substantially free of iridium clusters or iridium ensembles. In certain embodiments, the catalyst is substantially free of iridium-iridium metal bonds. In particular embodiments, the iridium bonds with one or more oxygen atoms in a lattice comprising the HZSM-5 zeolite. In more particular embodiments, the catalyst has an average coordination number of oxygen atoms to iridium of about 4.21±0.47. In certain embodiments, the HZSM-5 zeolite comprises a Si/Al ratio of about 11.5.

In some embodiments, the presently disclosed catalyst can be used in a hydrocracking process. As used herein, the term "hydrocracking" is generally referred to as a two-stage process that combines catalytic cracking, e.g., the breaking of long-chain hydrocarbons into shorter ones, and hydrogenation. Heavier feedstocks are cracked in the presence of hydrogen to produce more desirable products, including, but not limited to gasoline (petrol), jet fuel, diesel fuel, naphtha, and liquefied petroleum gas (LPG). The process typically employs high pressure, high temperature, a catalyst, and hydrogen.

Accordingly, in other embodiments, the presently disclosed subject matter provides a process for converting a plastic into one or more lower-molecular weight hydrocarbons, the process comprising: (a) providing a metal-exchanged zeolite catalyst; (b) contacting the plastic and catalyst in a fixed-bed flow reactor in a stream of hydrogen/nitrogen gas wherein the plastic and the catalyst are packed in one of a (i) mixed configuration; or (ii) layer-by-layer configuration; and (c) collecting the one or more lower-molecular weight hydrocarbons.

In certain aspects, the plastic comprises a thermoplastic. In particular aspects, the thermoplastic is selected from the group consisting of high-density polyethylene (HDPE), low-density polyethylene (LDPE), polypropylene (PP), polystyrene (PS), polyvinyl chloride (PVC), polyethylene terephthalate (PET), and mixtures thereof.

As used herein, the term "high density polyethylene (HDPE)" is a thermoplastic polymer produced from the monomer ethylene. HDPE has a high strength-to-density ratio and is used in the production of plastic bottles, corrosion-resistant piping, geomembranes, and plastic lumber. HDPE typically has a density ranging from about 930 kg/m³ to 970 kg/m³.

In certain embodiments, before the plastic is introduced into the reactor, it can be shredded or otherwise reduced to a particulate state. A variety of size reduction processes are known in the art including, but not limited to, a shredder, a chopper, a grinding apparatus or combinations thereof, which can be employed in a sequential, parallel, or tandem manner. In some embodiments, the plastic can first be subjected to a coarse shredding, chopping, or crushing operation. The coarsely shredded or chopped plastic can subsequently be grounded, pulverized, or further crushed to yield the fine particles required for the hydrocracking process. In some embodiments, the plastic is processed into pellets.

Additional pretreatment steps can be incorporated into the recycling process, if desired, such as flotation, washing, drying, separation, or the like. Non-polymeric materials such as metals, glass, wood, paper, cloth and the like can be removed from this separation process. The separation process can be accomplished using conventional means, such as a magnetic separation device, or a classification device separating according to density, such as a shaking table or a flotation tank. The separation process can be carried out before or after the size reduction step.

In some embodiments, the mixed configuration further comprises quartz sands mixed with the plastic and the catalyst. In other embodiments, the layer-by-layer configuration comprising a layer of plastic and a layer of catalyst, wherein the layer of plastic and layer of catalyst are separated by a layer of quartz sand. In certain embodiments, the layer-by-layer configuration results in a tandem reaction comprising separate pyrolysis of the plastic and catalytic hydrocracking of the plastic.

In certain embodiments, the metal-exchanged zeolite comprises a transition metal. In particular aspects, the transition metal is selected from the group consisting of Ti, V, Cr, Mn, Fe, Co, Ni, Cu, Pt, Pd, Ir, Au, Ag, Ru, Rh, Re, Os, Mo, and W.

In some embodiments, the zeolite is as described hereinabove. In certain embodiments, the zeolite is selected from the group consisting of clinoptilolite, chabazite, phillipsite, mordenite, analcime, heulandite, natrolite, and stilbite. In particular embodiments, the zeolite is selected from the group consisting of ZSM-5, SSZ-13, and mordenite.

In some embodiments, the process is conducted at a temperature from about 250° C. to about 450° C., including 250, 260, 270, 280, 290, 300, 310, 320, 330, 340, 350, 360, 370, 380, 390, 400, 410, 420, 430, 440, and 450° C. In particular embodiments, the temperature is from about 350° C. to about 400° C., including about 350, 355, 360, 365, 370, 375, 380, 385, 390, 395, and 400° C.

In some embodiments, the process is carried out for a time period from about 0.5 hours to about 3 hours, including about 0.5, 1.0, 1.5, 2.0, 2.5, and 3 hours. In certain embodiments, the process is carried out at atmospheric pressure, e.g., 1 atm or 760 mm Hg.

In some embodiments, the plastic and the catalyst are packed in a mixed configuration and the one or more hydrocarbons comprise one or more $C_2$-$C_7$ hydrocarbons. In particular embodiments, the one or more $C_2$-$C_7$ hydrocarbons comprise about 45% to about 55% $C_5$ hydrocarbons.

In other embodiments, the plastic and the catalyst are packed in a layer-by-layer configuration and the one or more hydrocarbons comprise one or more $C_2$-$C_{10}$ hydrocarbons. In particular embodiments, the one or more $C_2$-$C_{10}$ hydrocarbons comprise about 55% to about 65% $C_8$ hydrocarbons. In yet more particular embodiments, the $C_8$ hydrocarbons comprise about approximately 96% xylene and structural isomers thereof, e.g., ortho-, meta-, and para-xylene.

The term hydrocarbon, as used herein, refers to any chemical group comprising hydrogen and carbon. The hydrocarbon may be substituted or unsubstituted. As would be known to one skilled in this art, all valencies must be satisfied in making any substitutions. The hydrocarbon may be unsaturated, saturated, branched, unbranched, aliphatic, aromatic, cyclic, polycyclic, or heterocyclic.

Illustrative aliphatic hydrocarbons include $C_2$-$C_{10}$ aliphatic hydrocarbons, including $C_1$, $C_2$, $C_3$, $C_4$, $C_5$, $C_6$, $C_7$, $C_8$, $C_9$, and $C_{10}$, aliphatic hydrocarbons, including $C_2$ hydrocarbons including, but not limited to, ethane, ethene (ethylene), and ethyne (acetylene); $C_3$ hydrocarbons including, but not limited to, propane, propene, propyne, and cyclopropane; $C_4$ hydrocarbons including, but not limited to, butane, iso-butane, butene, butyne, 1,2-butadiene, cyclobutene, cyclobutene, and cyclobutene; $C_5$ hydrocarbons including, but not limited to, pentane, isopentane, neopentane, cyclopentane, pentene, and cyclopentene; $C_6$ hydrocarbons, including, but not limited to hexane, cyclohexane, cyclohexene; $C_7$ hydrocarbons including, but not limited to heptane, cycloheptane, and cycloheptene; $C_8$ hydrocarbons including, but not limited to, octane, cyclooctane, and cyclooctene; $C_9$ hydrocarbons including, but not limited to, nonane; and $C_{10}$ hydrocarbons including, but not limited to, decane, and homologs and isomers thereof.

The aliphatic hydrocarbons can be substituted, for example, with one or more saturated hydrocarbon, e.g., alkyl, groups including, but not limited to, methyl, ethyl, n-propyl, isopropyl, n-butyl, isobutyl, sec-butyl, tert-butyl, n-pentyl, sec-pentyl, isopentyl, neopentyl, n-hexyl, sec-hexyl, n-heptyl, n-octyl, n-decyl, n-undecyl, dodecyl, cyclohexyl, (cyclohexyl)methyl, cyclopropylmethyl, and homologs and isomers thereof.

"Branched" refers to an alkane in which a lower alkyl group, such as methyl, ethyl or propyl, is attached to a linear alkane chain. In certain embodiments, "alkane" refers, in particular, to $C_{2-10}$ straight-chain alkanes. In other embodiments, "alkane" refers, in particular, to $C_{2-10}$ branched-chain alkanes.

"Cycloalkane" or "cycloalkene" refer to a non-aromatic mono- or multicyclic ring system of about 3 to about 10 carbon atoms, e.g., 3, 4, 5, 6, 7, 8, 9, or 10 carbon atoms. The cycloalkane can be optionally partially unsaturated. The cycloalkane or cycloalkene group also can be optionally substituted with an alkyl group substituent as defined herein. There can be optionally inserted along the cyclic alkyl chain one or more oxygen, sulfur or substituted or unsubstituted nitrogen atoms, wherein the nitrogen substituent is hydrogen, unsubstituted alkyl, substituted alkyl, aryl, or substituted aryl, thus providing a heterocyclic group. Representative monocyclic cycloalkanes rings cyclopentane, cyclohexane, cycloheptane, cyclooctane, cyclononane, and cyclodecane.

An unsaturated hydrocarbon has one or more double bonds or triple bonds. More particularly, the term "alkene" as used herein refers to a monovalent group derived from a $C_{2-10}$ inclusive straight or branched hydrocarbon having at least one carbon-carbon double bond by the removal of a single hydrogen molecule. Examples of alkenes include, but are not limited to, ethene, propene, butene, pentene, hexene, heptene, octene, nonene, and decene higher homologs and isomers.

The term "cycloalkene" as used herein refers to a cyclic hydrocarbon containing at least one carbon-carbon double bond. Examples of cycloalkenes include cyclopropene, cyclobutene, cyclopentene, cyclopentadiene, cyclohexene, 1,3-cyclohexadiene, cycloheptene, cycloheptatriene, cyclooctene, cyclononene, and cyclodecene.

The term "alkynyl" as used herein refers to a monovalent group derived from a straight or branched $C_{2-10}$ hydrocarbon of a designed number of carbon atoms containing at least one carbon-carbon triple bond. Examples of "alkynes" include ethyne, propyne, pentyne, hexyne, heptyne, octyne, nonyne, and decyne and the like.

The term "aromatic hydrocarbon" includes benzene ($C_6$), toluene ($C_7$), ethylbenzene ($C_8$), o-, m-, and p-xylene ($C_8$), mesitylene ($C_9$), durene ($C_{10}$), and the like. The aromatic hydrocarbon can be substituted, for example, with one or more alkyl groups as defined herein.

Further, a structure represented generally by the formula:

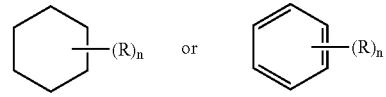

as used herein refers to a ring structure, for example, but not limited to a 3-carbon, a 4-carbon, a 5-carbon, a 6-carbon, a 7-carbon, and the like, aliphatic and/or aromatic cyclic compound, including a saturated ring structure, a partially saturated ring structure, and an unsaturated ring structure, comprising a substituent R group, wherein the R group can be present or absent, and when present, one or more R groups can each be substituted on one or more available carbon atoms of the ring structure. The presence or absence of the R group and number of R groups is determined by the value of the variable "n," which is an integer generally having a value ranging from 0 to the number of carbon atoms on the ring available for substitution. Each R group, if more than one, is substituted on an available carbon of the ring structure rather than on another R group. For example, the structure above where n is 0 to 2 would comprise compound groups including, but not limited to:

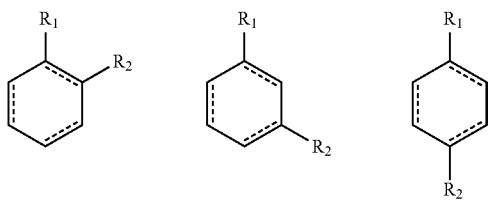

and the like.

A dashed line representing a bond in a cyclic ring structure indicates that the bond can be either present or absent in the ring. That is, a dashed line representing a bond in a cyclic ring structure indicates that the ring structure is selected from the group consisting of a saturated ring structure, a partially saturated ring structure, and an unsaturated ring structure.

In certain embodiments, the hydrogen/nitrogen gas comprises about a 5% hydrogen/95% nitrogen mixture.

In other embodiments, the process further comprises collecting the one or more lower-molecular weight hydrocarbons in a gas/liquid separation unit. In certain embodiments, the gas/liquid separation unit further comprises a heat exchanger network. In particular embodiments, the heat released from gas/liquid separation unit is captured by the heat exchanger network and used to heat an inlet stream of hydrogen gas. In yet other embodiments, the process further comprises capturing residual hydrogen/nitrogen gas and returning it to an inlet for the process.

II. Definitions

Although specific terms are employed herein, they are used in a generic and descriptive sense only and not for purposes of limitation. Unless otherwise defined, all technical and scientific terms used herein have the same meaning as commonly understood by one of ordinary skill in the art to which this presently described subject matter belongs.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Upcycling of High-Density Polyethylene by Thermocatalytic Hydrocracking 1.1 Overview The widespread use of large volumes of plastics has created serious environmental issues, which demand proper end-of-life management of plastic wastes. The presently disclosed subject matter provides for the catalytic conversion of energy-rich high-density polyethylene (HDPE) into highly valuable products dominated with xylene by hydrocracking using single Ir sites confined in HZSM-5. The hydrocracking processes are carried out through two configurations of packing the HDPE and catalysts: well mixed and layered (also referred to herein as "layer-by-layer").

$C_2$-$C_7$ hydrocarbons, dominated with approximately 52% of $C_5$ hydrocarbons, are obtained in the well-mixed configuration, while $C_2$-$C_{10}$ hydrocarbons, populated with approximately 58% of $C_8$ hydrocarbons (xylene accounts for approximately 96%), are derived in the layer-by-layer configuration by taking advantage of a tandem reaction. Kinetic studies reveal that both acid sites and single Ir sites are active sites for the hydrocracking of HDPE. Acid sites are responsible for C—C scission, which is the rate-limitation step, which could be accelerated by dehydrogenation/hydrogenation occurring on single Ir sites. Comparative studies of Ir@ZSM-5 with the nanoparticulated counterpart demonstrated that the intrinsic shape-selective feature of ZSM-5 channels account for the high selectivity of $C_8$ hydrocarbons (xylene). The good durability of Ir@ZSM-5 also implies the great potential for practical implementations. The techno-economic assessment reveals the presently disclosed HDPE hydrocracking system exhibits high economic profitability in term of short payback periods, high IRR, and achieve sustainability with clean energy sources.

1.2 Background

Polyethylene (PE) is the largest-volume plastic in the world. In contrast to the successful feedstock recovery from poly(ethylene terephthalate) and polystyrene, PE is remarkably inert and difficult to degrade without special treatment. Kaminsky et al., 2009. To date, there have been a few reports of catalytic hydrocracking of PE with high selectivity of valuable products. In particular, Jia et al., 2016, proposed a tandem catalytic cross alkane metathesis method for degradation of PE into liquid products. The addition of extra alkanes inevitably increased the cost of manufacturing and the low quality of wax was unavoidable (selectivity >30%), as well. Celik et al., 2019, presented a successful attempt of hydrogenolysis by using Pt/SrTiO$_3$ and completely converted PE into lubricants and waxes. This process, however, required harsh reaction conditions (170 psi $H_2$ and 4 days).

Zeolites/molecular sieves are widely used catalysts in the thermo pyrolysis of plastics, but present challenges in wide product distribution and coke deposition during pyrolysis process. Serrano et al., 2012; Achilias et al., 2007; Wong et al., 2016; Zhang et al., 2019. Recently, Al-SBA-15 was applied to converted low-density polyethylene (LDPE) to obtain saturated $C_4$ to $C_{10}$ products with $C_5$ dominating, but the catalytic features responsible for implementing the reaction pathways were not clear. Zhang et al., 2019.

The presently disclosed subject matter, in part, provides energy-efficient upcycling of plastics by using thermocatalytic hydrocracking. High-density polyethylene (HDPE) is converted selectively into $C_5$ or $C_8$ liquid hydrocarbons by using iridium-exchanged zeolites (Ir@ZSM-5) as catalysts. The Ir@ZSM-5 catalysts were characterized by using HAADF-STEM, X-ray adsorption spectroscopy, and DRIFTS analysis using CO as a molecular probe confirming the absence of Ir ensembles. The Ir@ZSM-5 catalysts of various loadings (with 0.05-1.0 wt % of Ir) were then evaluated for catalytic hydrocracking of HDPE, resulting in the formation of $C_2$-$C_{10}$ hydrocarbons, including $C_2$, $C_3$, $C_4$, $C_5$, $C_6$, $C_7$, $C_8$, $C_9$, and $C_{10}$ hydrocarbons, with the selectivity for $C_8$ hydrocarbons greater than 55% (FIG. 1). This process depended on the Si/Al ratios and exhibited very tiny coke deposition, due to the benefit of the single atom dispersion of Ir cations on the ZSM-5 zeolite lattice structure.

1.3 Results and Discussion 1.3.1 Synthesis and Characterization of Single Ir Catalytic Site in ZSM-5.

The iridium catalysts were synthesized through a method integrating vacuum pumping, wet ion-exchange and hot water washing. Ir@ZSM-5 catalysts with four Ir loadings (0.05%, 0.25%, 0.5%, 1 wt %) were synthesized, which are denoted as X Ir@ZSM-5 in the following discussion, where X stands for the Ir loading. The concentrations of Ir cations in the as-synthesized catalyst were measured through inductively coupled plasma-mass spectrometer (ICP-MS) as 0.048, 0.23, 0.51, and 0.78 wt %.

To gain an extensive evaluation of the atomic dispersion of Ir, diffuse reflectance infrared Fourier transform spectroscopy (DRIFTS) analysis of CO adsorption on the Ir@ZSM-5 catalysts were performed. This method has previously been demonstrated to be effective in identification of single Ir atoms in other substrates. FIG. 2a compares the absorption spectra recorded on the Ir@ZSM-5 catalysts with various loadings of Ir (0.05, 0.25, 0.5 and 1.0 wt %), where CO was pre-adsorbed and subsequently purged by helium. Only one peak was observed at 2049 cm$^{-1}$ for the Ir@ZSM-5 catalysts with 0.05% and 0.25% of Ir (FIG. 1a), which can be assigned to the linearly bonded CO (COL) on Irδ+. An additional broad peak at 1933 cm$^{-1}$ appears in 0.5 and 1.0% Ir@ZSM-5 (FIG. 2a), which can be ascribed to the bridge bonded CO (COB) on Ir, a typical feature of Pt ensembles with continual surfaces. The absence of the COB peak thereby confirms the isolation of Ir sites in the Ir1@ZSM-5 catalysts at relatively low Ir ratios (e.g., <0.25%), whereas Ir clusters have formed in the case with higher loadings.

FIG. 2b shows aberration-corrected high angle annular dark-field scanning transmission electron microscopy (ac-HAADF/STEM) images of as-synthesized Ir1@ZSM-5 catalyst with approximately 0.25 wt % of Ir. In this image, and as illustrated in further details in FIG. 7, individual Ir sites are exhibited as bright dots with higher contrast than the surrounding zeolitic lattice.

Ir K-edge Extended X-ray Absorption Fine Structure (EXAFS) experiments were performed to identify the coordination environment of Ir cation anchored in ZSM-5. R-space spectrum of K-edge of Ir showed that the Ir cation bonds with oxygen atoms and the average coordination number of oxygen atoms to a Ir cation was CN(Ir—O) of 4.21±0.47 (FIG. 2c). This observation is consistent with the oxidization state (+4) of Ir shown in FIG. 2d. Compared with the references of Ir foil and 10 wt % IrO$_2$/Al$_2$O$_3$, notably, no contribution of Ir—Ir metal bonds was needed to fit the r-space spectrum of Ir K-edge, suggesting that there is no evidence for formation of Ir—Ir metal bonds.

X-ray diffraction (XRD) patterns collected for the Ir@ZSM-5 catalyst only show typical MFI structure of the ZSM-5 (FIG. 9), where the absence of Ir-phase peaks is consistent with the atomic dispersion of Ir as observed in the FTIR, STEM and XAFS characterizations.

1.3.2 Catalytic Hydrocracking of HDPE Using Ir@ZSM-5 via Mixing Configuration.

Ir@ZSM-5 catalysts and the HZSM-5 were evaluated by the catalytic hydrocracking of HDPE. The reaction process design is schematically shown in FIG. 10. The catalytic hydrocracking of HDPE was conducted in a fixed-bed flow reactor at atmospheric pressure. To minimize the mass transfer limitation, 40-60 mesh quartz sands and Ir@ZSM-5 were evenly packed with HDPE pellets, which was defined as a mixing or well-mixed configuration. A cool trap was set between the reactor and the gas chromatograph (GC) to condense the products with high boiling points (B.P.). After reaction, the solid residual was treated by toluene for a half hour at 160° C., then immediately filtered at high temperature. The item dissolved in toluene was denoted as "plastic residuals." The leftover solid after toluene extraction was vacuum dried thoroughly overnight, then calcined in air, the effluent was combusted to determine the amount of deposited coke in the catalyst. On the other side, for the liquid mixture after filtration, the plastic residual was precipitated gradually when the temperature cooled down to room temperature, which then was weighed by precious mass balance after removing the solvent. The results exhibited that on each catalyst, the products were consisted of $C_2$-$C_7$ hydrocarbons (FIG. 11 displays a representative profile of the GC results with the retention time of 1 h measured via mixing configuration, showing that it consists of $C_2$-$C_7$ hydrocarbons only) and coke, there also were some HDPE not converted, which was defined as plastic residuals. Mass balance was closed after careful quantification of each product.

Figure 3:
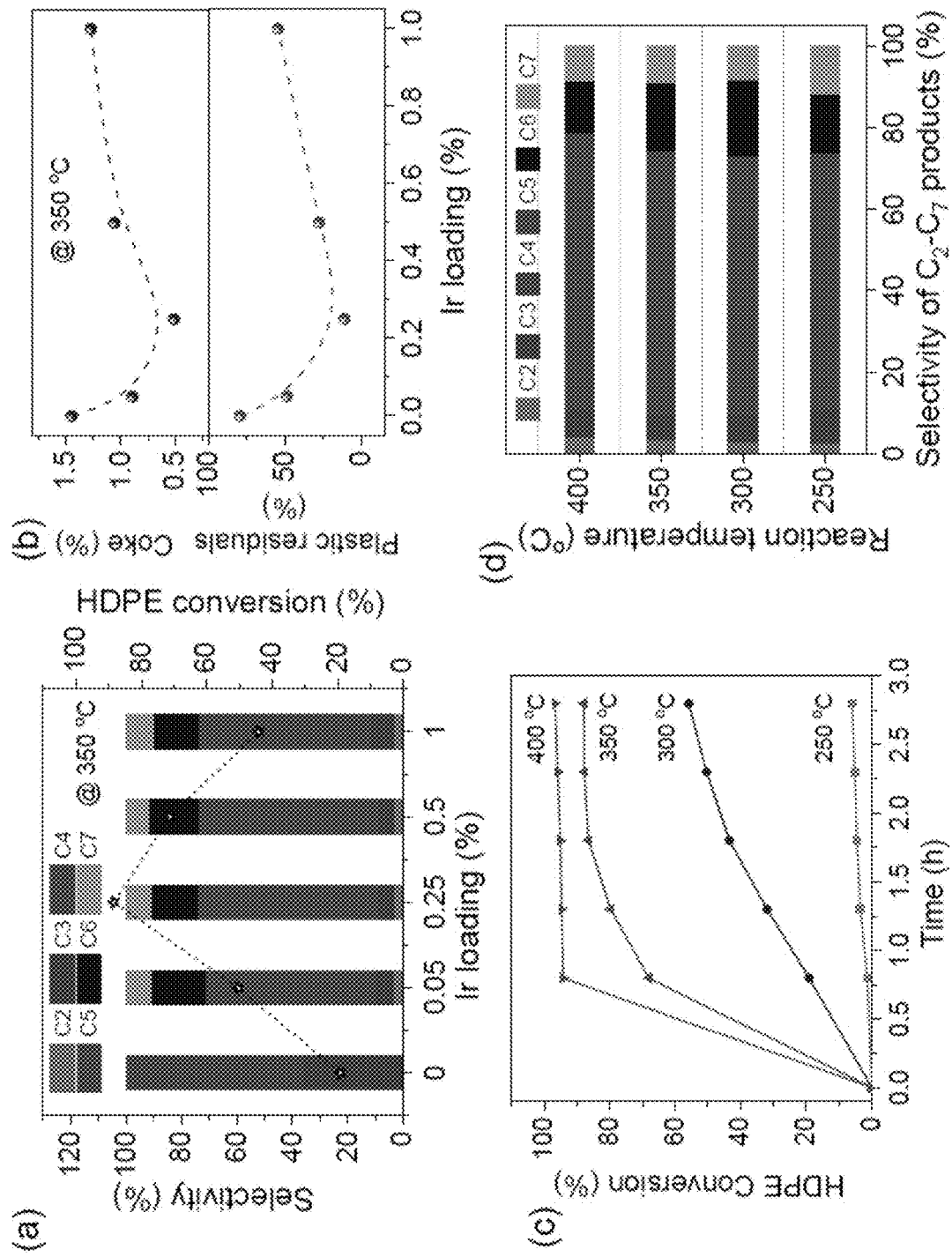

FIG. 3a summarizes HDPE conversion and the selectivity of $C_2$-$C_7$ hydrocarbons at 350° C. as a function of Ir loading. The HDPE conversion exhibited a volcano-type trend dependent on Ir loadings. For H-ZSM-5, the HDPE conversion was 19.2%. With the addition of confined iridium in H-ZSM-5, the conversion increased gradually, and achieved the maximum value of 88.4% on 0.25% Ir@ZSM-5, then decreased to 44.1% on 1% Ir@ZSM-5. It was reported that iridium sites were catalytically active for dehydrogenation/hydrogenation, Yang et al., 2015, which can improve the HDPE degradation when coupling with hydrocracking. Weitkamp, 2012.

FIG. 3a also compares the selectivities of $C_2$-$C_7$ products for all the samples. For HZSM-5, only $C_3$, $C_4$, and $C_5$ products were detected, the selectivity of $C_3$ and $C_4$ were close to 80%, indicating that HDPE was cracked to light paraffins, which were similar with the literature, Wong et al, 2016; Miskolczi et al., 2009, reporting that higher acidity can capture more HDPE, and then further crack into hydrocarbons with small chains. On Ir@ZSM-5 catalysts, however, $C_5$ products dominated, the selectivity of which was around 52%, and the product distribution was independent of the Ir loading. It also was noted that the selectivity of gasoline-type products ($C_5$-$C_7$) was higher than 80%, indicating that HDPE can be depolymerized and upcycled to gasoline.

FIG. 3b displays the trends of coke deposition and plastic residuals at 350° C. depending on Ir loading, showing that at higher coke deposition, more plastic residuals remain, which implies that coke deposition caused the decrement in the catalytic activity. As reported previously, Castano et al., 2011; Elordi et al., 2011, the coke easily formed on the HZSM-5 with a low Si/Al ratio. Likewise, the Si/Al ratio of HZSM-5 used in the current work is 11.5, which easily caused the coke formation. The decoration of a single Ir atom not only can partially reduce the acidity of ZSM-5, but also can prevent the C—C formation, further avoiding the coke deposition. Guo et al., 2014; Xie et al., 2018. Therefore, less coke was produced on Ir@ZSM-5 with lower Ir loading (single atomic dispersion). The increment in Ir loading, however, may lead to the aggregation of Ir, causing the formation of Ir clusters, as indicated by DRIFTS (FIG. 2a). Therefore, more coke deposited on Ir sites in 0.5% and 1% Ir@ZSM-5 (FIG. 3b), showing that the coke amount increased again, eventually accelerated the deactivation of the catalysts.

The temperature-dependence of HDPE degradation on 0.25% Ir@ZSM-5 also was investigated in FIG. 3c. The catalytic hydrocracking of HDPE was performed from 250° C. to 400° C. for 2.75 h at each temperature. As reflected by FIG. 3c, the HDPE conversion increased with temperature. At 250° C., only a tiny amount of HDPE was decomposed, and the HDPE conversion reached 94.3% at 400° C. It was noteworthy that the rate of the hydrocracking of HDPE increased with temperature. HDPE can be rapidly cracked in the first 1 hour, indicating that the process was a kinetic controlled process above 250° C. FIG. 3d compared the products distribution on each temperature. Throughout the investigated temperatures, the products all consisted of $C_2$-$C_7$ hydrocarbons, and $C_5$ species dominated, the selectivity of which was around 53%. On the other side, with temperature ramping up, the sums of the selectivities of $C_2$-$C_4$ increased from 20.9% to 24.5%, whereas the sums of the selectivities of $C_6$-$C_7$ decreased from 26.3% to 21.3%, suggesting that the heavy hydrocarbons were cracked into light molecules at elevated temperature.

The stability of 0.25% Ir@ZSM-5 was investigated at 400° C. for 5 cycles of measurement. The catalyst was used without regeneration, and HDPE was fed after each cycle. As shown in FIG. 12, the catalyst was stable at the first two runs, with the HDPE conversion slightly decreased from 92.0% to 87.9%. The HDPE conversion, however, decreased rapidly starting from the 3rd run. After 5th measurement, the HDPE conversion dropped to 35.8%, which was due to the severe coke deposition (3.52 mg coke per gram of catalyst). It also was noted no matter the decrement of the catalytic activity, that the yield of $C_5$ hydrocarbons was always higher than other products.

1.3.3. Catalytic Hydrocracking of HDPE Using Ir@ZSM-5 Via Layer Configuration.

It was found that by mixing HDPE and Ir@ZSM-5 well, HDPE was converted into $C_2$-$C_7$ hydrocarbons, however, the light hydrocarbons ($C_2$-$C_5$) accounted for main products, the selectivity of which was higher than 80% (the selectivity of $C_5$ was around 53%). By taking the economic evaluation of the products into consideration, the more valuable products (e.g., $C_8$ species) were more desirable. Moreover, the catalyst was deactivated by coke deposition (after three-time measurements), which may be because of the close contact between HDPE and the catalyst. As investigated by many others in the literature, catalytic conversion of HDPE went through the meltdown, diffusion, and cracking on the external surface, also accompanied by the pyrolysis at high temperature (>300° C.). Aguado et al., 2008; Kunwar et al., 2016; Kumara et al., 2011. The miscellaneous process either can block the channels of the zeolite, Castano et al., 2011; Ibanez et al., 2014, or cause the severe coke deposition at low Si/Al ratio (<15). Elordi et al., 2011.

Figure 4:
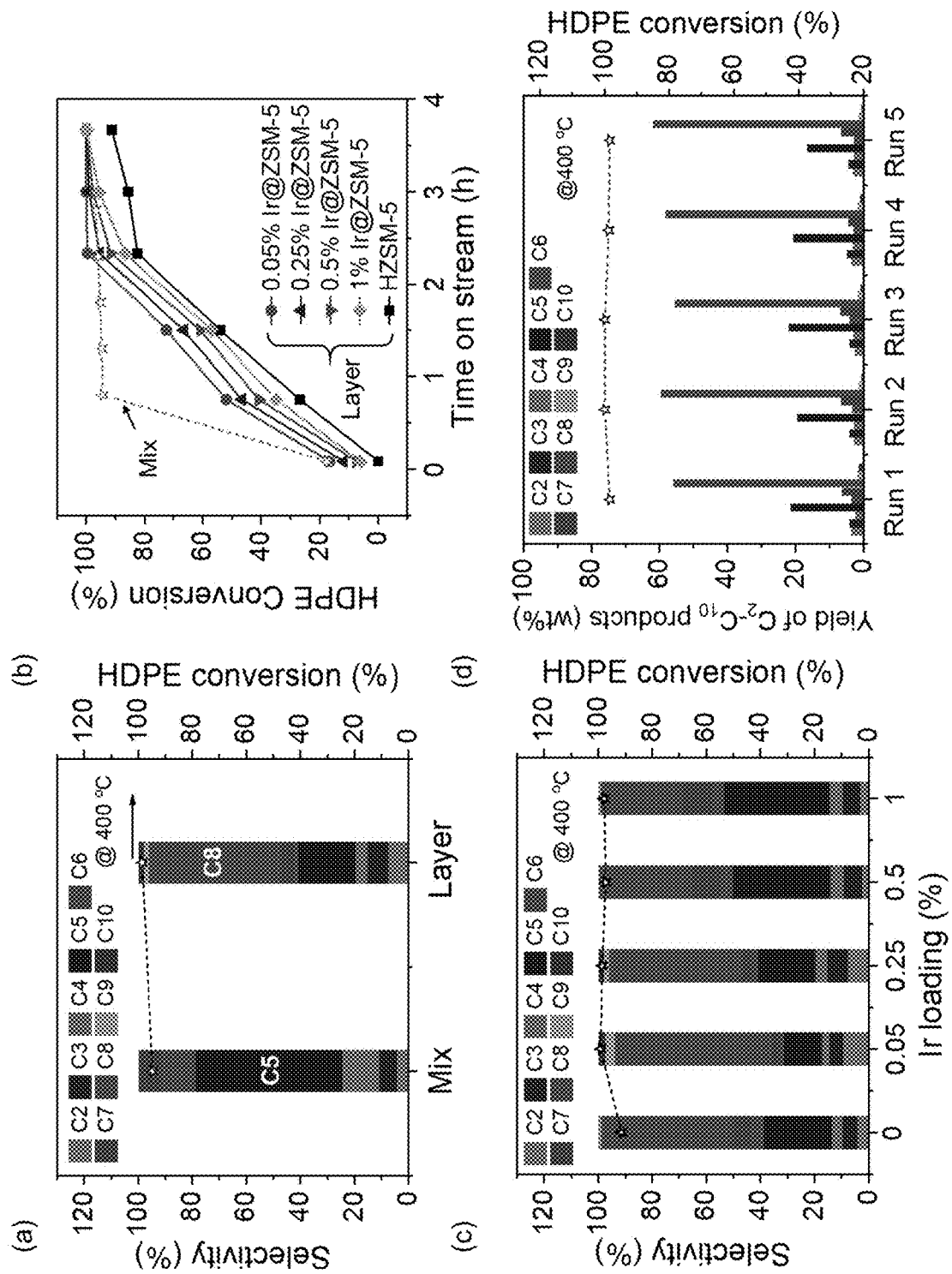

To precisely control this process, the configuration of packing the HDPE and catalyst layer-by-layer (also defined herein as a layer configuration) separated the meltdown, diffusion, pyrolysis of HDPE and the catalytic cracking reaction into two stages. A tiny amount (200 mg) acid-washed quartz sands were set between the HDPE and the catalysts to make the diffusion process even. On the top, HDPE can be converted to the hydrocarbons with short chains (also including the unconverted polyethylene molecules), which diffused through the sands layer, and reached to the catalyst, then cracked on the surface of the catalyst (Ir@ZSM-5). FIG. 4a compared the catalytic performance of different reactor design by using 0.25% Ir@ZSM-5. By carrying out the hydrocracking of HDPE in the layer configuration, the products consisted of $C_2$-$C_{10}$ hydrocarbons (see the representative profile of the GC results with the retention time of 1 h in FIG. 11b measured via layer configuration), with the selectivity of $C_8$ around 55%, and herein the selectivity of $C_2$-$C_5$ was less than 40%. While the products derived from the evaluation by mixing configuration populated with the selectivity of $C_5$ around 52%, the selectivity of $C_2$-$C_5$ was higher than 80%, and no $C_8$ was formed. Additionally, the HDPE conversion was 100% obtained in the former measurement, slightly higher than the latter case (approximately 92%, FIG. 4a).

The pyrolysis of HDPE with and without acid-washed sands also were performed as the control experiments (no catalysts loaded). As evidenced in FIG. 13, either with or without sands, the HDPE was depolymerized and mainly converted to $C_5$ and $C_6$ hydrocarbons, accounting for approximately 80% in the total amount of products, but the HDPE conversion was only approximately 2%, due to the relatively low reaction temperature. Most of the HDPE was diffused and condensed in the downstream where the temperature was lower. The addition of 0.25% Ir@ZSM-5, however, dramatically changed the product distribution. HDPE was totally converted to $C_2$-$C_{10}$ hydrocarbons, as presented above. Without wishing to be bound to any one particular theory, it is thought that the separation and coupling of catalytic hydrocracking with the pyrolysis was able to preciously control and manipulate the process by involving the cracking, isomerization, aromatization, and the like, to push the reaction to the right side, and kinetically accelerated the reaction, along with the formation of $C_8$ hydrocarbons. The mechanism and kinetics will be discussed in the next section herein below.

The HDPE can be mostly converted within the first hour in the mixing configuration, while the HDPE conversion obtained by the measurement of layer configuration climbed slowly, taking 2 hours to reach the conversion of 100%. It can be understood that the separation of the HDPE layer from catalyst layer increased the diffusion path of either HDPE or the products pyrolyzed from HDPE, resulting in the slow reaction rate of HDPE hydrocracking.

Figure 14:
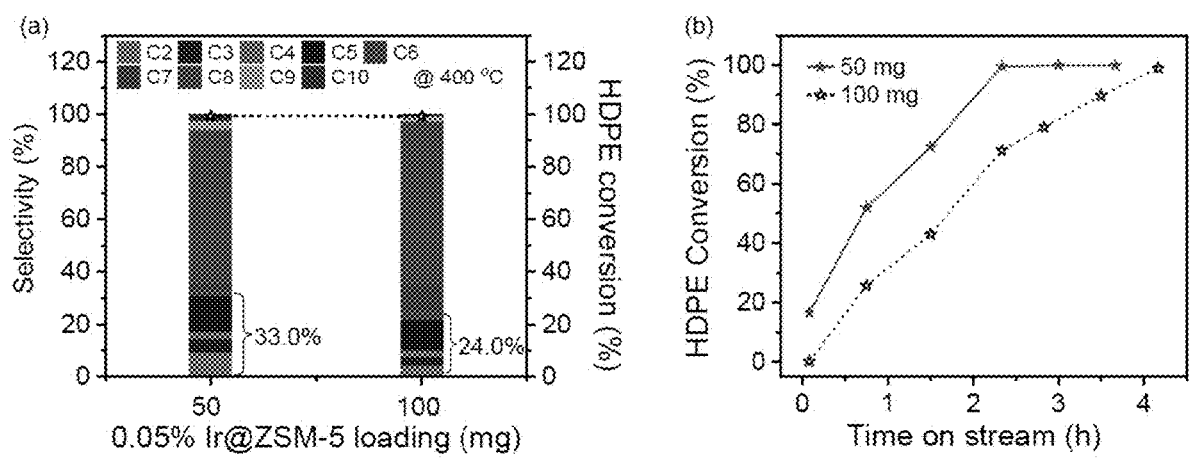

The effect of Ir loading on the hydrocracking of HDPE was investigated in FIG. 4c. The HDPE conversion and the selectivity of all the products at 400° C. were present. The catalytic performance of HZSM-5 also was compared, the conversion of HDPE of which was 91.5%, and the selectivity of $C_8$ hydrocarbons was 49.4%, whereas the total selectivity of $C_2$ to $C_6$ hydrocarbons was 43.6%. Basically, the addition of Iridium increased the HDPE conversion from 91.5% to approximately 100%, while the products distribution was dependent on the amount of Ir anchored in ZSM-5. For 0.05% Ir@ZSM-5, the selectivity of $C_8$ hydrocarbons was increased to 58.1%, whereas the total selectivity of $C_2$ to $C_6$ hydrocarbons was decreased to 32.9%, which can be further reduced to 24%, and the selectivity of $C_8$ can be increased to 62.4% by doubling the catalyst loading (FIG. 14). With the increment of Ir loading, however, the selectivity of $C_8$ hydrocarbons gradually declined, and the total selectivity of $C_2$ to $C_6$ hydrocarbons gradually increased, especially the selectivity of $C_5$ apparently increased. For 1% Ir@ZSM-5, the selectivity of $C_8$ hydrocarbons was decreased to 30.5%, whereas the total selectivity of $C_2$ to $C_6$ hydrocarbons was increased to 58.3%, herein the selectivity of $C_5$ was 38.9%. Moreover, the $C_8$ products also were respectively quantified and xylene accounts for approximately 96%.

The coke deposition information on the catalysts was plotted in FIG. 15. Less coke formed in the catalytic hydrocracking via layer configuration, compared to the mixing configuration. The yields of coke obtained in the former were 0.065% to 0.25%, while 0.51% to 1.45% of coke were determined in the latter. The fast reaction rate of coke deposition was expected by the minimum diffusion path in the mixing configuration. In layer configuration, more of coke was formed on HZSM-5 (yield of coke: 0.25%), which was due to higher amount of acidity (shown in the following discussion). The yield of coke on 0.05% Ir@ZSM-5 decreased dramatically to 0.065%. The yield of coke increased with the Ir loading, which may be because of aggregation of Ir sites. For instance, the yield of coke was 0.11% on 0.1% Ir@ZSM-5. It was reported that single Ir sites were able to inhibit the coke deposition by preventing the C—C coupling. Guo et al., 2014; Xie et al., 2018.

FIG. 4b shows time-dependent HDPE conversions among the Ir@ZSM-5 and HZSM-5 catalysts at 400° C. HZSM-5 exhibited the lowest HDPE conversion, compared to Ir@ZSM-5. It was reported that Ir@ZSM-5 can accelerate the reaction rate via dehydrogenation/hydrogenation on iridium. Weitkamp, 2012. For Ir@ZSM-5, 0.05% Ir@ZSM-5 delivered higher HDPE conversion than other catalysts, whereas the HDPE conversion dropped with the addition of Ir loading. After 45 min of reaction, the HDPE conversion reached 52.0%, 46.6%, 40.8% and 34.8% for 0.05%, 0.25%, 0.5% and 1% Ir@ZSM-5 respectively. The negative effect of higher Ir loading on the HDPE conversion may be caused by the oligomerization of Ir sites during the reaction (see the details in FIG. 2), resulting in the weaker interaction between Ir and $H_2$, which will be discussed in the following section.

Ultimately, the presently disclosed subject matter demonstrates that both the high catalytic activity and yields of the 0.05% Ir@ZSM-5 catalysts were stable, with indiscernible drop after 5 measurements of reaction at 400° C. (FIG. 4d, the catalyst was reused without any treatment between two measurements), which also was highlighted by comparing with the activity of HZSM-5, which tended to drop after three runs of measurement (FIG. 16). The high durability further confirmed the 0.05% Ir@ZSM-5 catalyst reported here thus possess great potential for practical implementations.

1.3.4 Mechanistic and Kinetic Studies.

Figure 5:
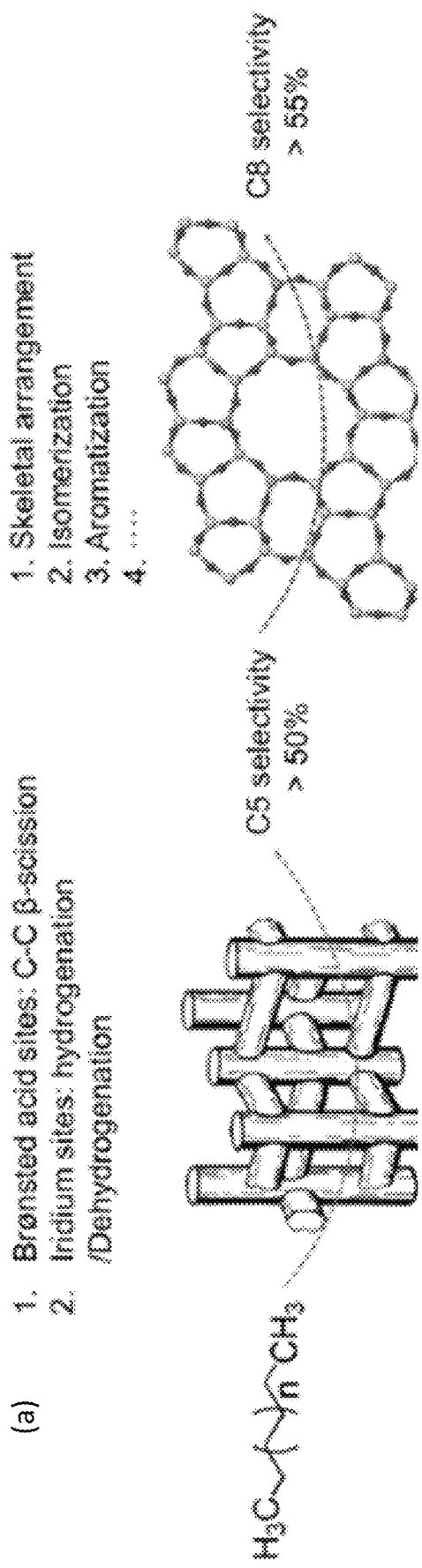
Figure 5:
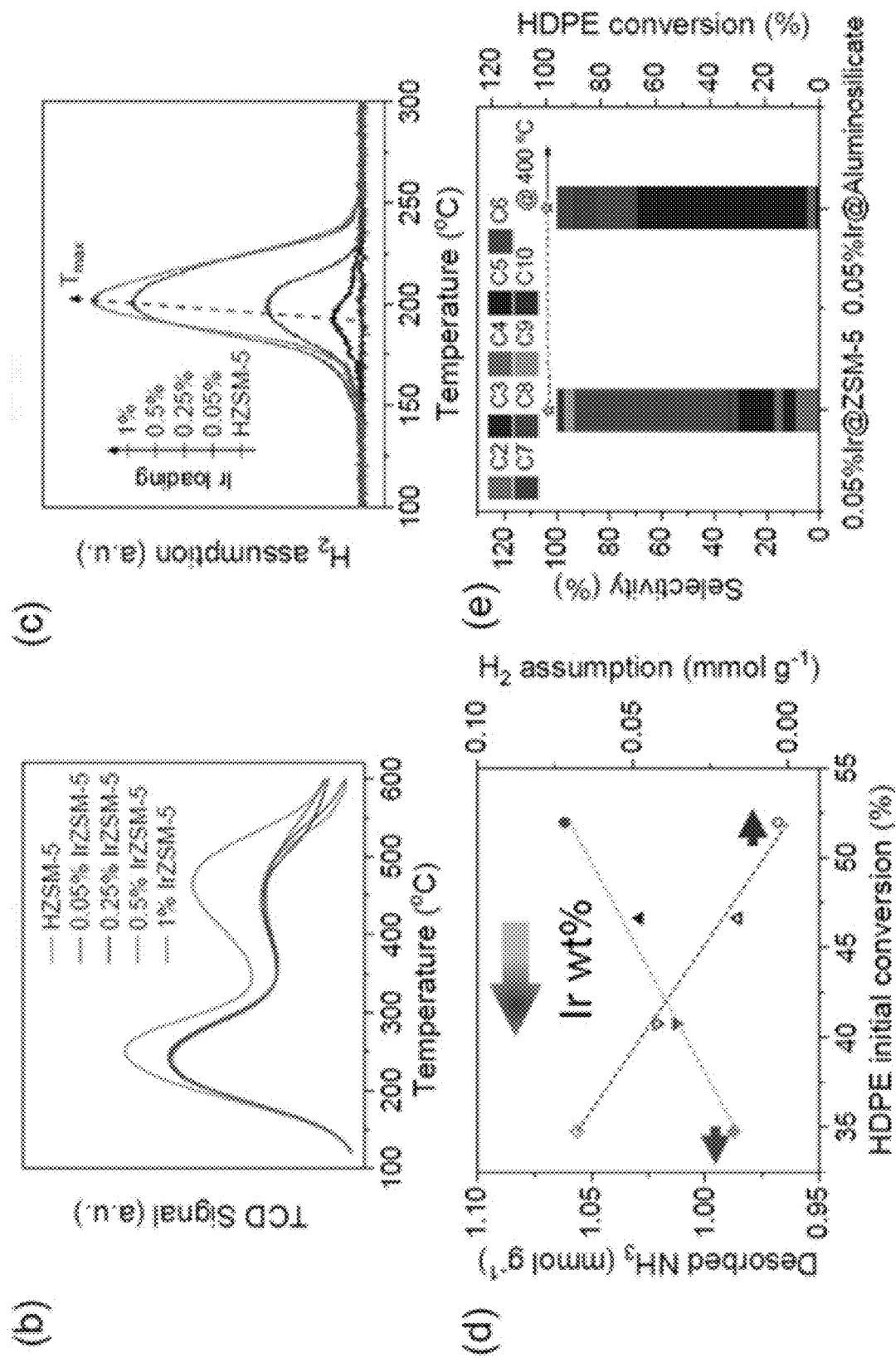

In the term of mechanism discussion, FIG. 5a preliminarily elucidated the mechanism of the catalytic hydrocracking of HDPE on Ir@ZSM-5 measured in the layer configuration, producing the products dominated with $C_8$ hydrocarbons. The design of layer configuration was to take advantage of tandem reaction concept by separating the pyrolysis and catalytic hydrocracking of HDPE. Initially, the HDPE was pyrolyzed to the hydrocarbons with short chains (also including the unconverted polyethylene molecules), then diffused to the external surface of Ir@ZSM-5. It was well studied that these hydrocarbons would be hydrocracked on the acid sites by C—C scission on the external surface and the pore mouths of ZSM-5. Serrano et al., 2012; Songip et al., 1993. The cracking process was accompanied by dehydrogenation/hydrogenation on the Ir sites in the presence of hydrogen. Weitkamp, 2012; Mills et al., 1953; Weisz and Swegler, 1957.

During this stage, the products were populated with more $C_5$ hydrocarbons, the selectivity of which was around 52%. Sequentially, these products, together with the reaction intermediates (e.g., carbenium ions which were energetically unfavorable), hence underwent a number of conversions, such as skeletal rearrangements, isomerization, aromatization, and the like processes, Serrano et al., 2012; Weitkamp, et al., 2012; Mills et al., 1953; Weisz and Swegler, 1957, and forming the products dominated with $C_8$ hydrocarbons on the acid sites and Ir sites in the channels of ZSM-5 with the assistance of shape-selectivity feature. Rahimi and Karimzadeh, 2011; Verheyen et al., 2013; Yu et al., 2012. To kinetically and quantitatively understand the catalytic hydrocracking of HDPE, the acidity and Iridium fractions were quantified by $NH_3$-TPD and $H_2$-TPR characterizations.

It was reported that $NH_3$ can be adsorbed on the acid sites. Generally, ammonia was bonded to the surface mainly in two different modes. (1) The ammonia was protonated by a proton from a surface Brønsted acid sites. (2) The lone pair electron of the nitrogen atom was donated to the metal cation, which acted as a Lewis acid. Al-Dughaither and de Lasa, 2014; Lonyi and Valyon, 2001; Yin et al., 1999.

It should be clarified that $NH_3$-TPD was not able to distinguish the Bøonsted and Lewis acid sites, but the total acid density of the catalyst can be determined by $NH_3$-TPD technique, and the results were shown in FIG. 5b. Typically, there are two desorption peaks for all the samples. One of the peaks centered at 210-240° C., which can be assigned to ammonia weakly interacting with acid sites. The other peaks at 450-480° C., related to stronger acid sites. Al-Dughaither and de Lasa, 2014; Lonyi and Valyon (2001).

With the loading of iridium, the intensities of strong and weak acid sites over the HZSM-5 shows an obvious decrease, and the latter changes more apparently than the former. Iridium cations were reported to exchange with the protons belonging to the acid sites associated with aluminum position in the structure of ZSM-5, which were mostly related to the strong acid sites. Meanwhile, the weakly acidic silanol group also can be reduced during the synthesis, especially the calcination process. Al-Dughaither and de Lasa, 2014; Lonyi and Valyon (2001). The overall effects would result in a significant reduction in acidity of pristine HZSM-5, especially strong acid sites. Integration of the desorption peak, then applied into the calibration curve can give the amount of acid density on each sample.

$H_2$-TPR experiment was performed to quantify the accessible Ir loadings and demonstrate the redox properties of the Ir species. FIG. 5c shows that a peak centered at around 200° C. is observed when iridium is loaded, which can be attributed to the reduction of $IrO_2$ to metallic Ir. Lin et al., 2011; Wang et al., 2017. The HZSM-5 also was proven to be inactive in $H_2$-TPR measurement. For Ir@ZSM-5 catalysts with different iridium loadings, the areas of the reduction peaks increased with the increment of Ir amount, which can be measured by fitting into the calibration cure. Meanwhile, the reduction peak gradually shifted to high temperature as Ir loading increased, indicating that the redox capabilities (i.e., the interaction between iridium and $H_2$) of Ir@ZSM-5 were weakened when Ir loading increased, which may be caused by the aggregation of Ir sites, consistent with the literature, Lin et al., 2011; Wang et al., 2017, thus would further slowdown the rate of the hydrogenation and dehydrogenation of Ir@ZSM-5.

FIG. 5d correlated specific reaction rate (defined by the HDPE conversion at 45 min, which was denoted as HDPE initial conversion) with the acidities (the amount of desorbed ammonia) and Ir loadings ($H_2$ assumption) for all the catalysts. Compared with pure HZSM-5, Ir@ZSM-5 catalysts exhibit the higher reaction rates of HDPE decomposition. According to Coonradt and Garwood's model, Coonradt and Garwood, 1964, the literature highlighted that the desorption of reaction intermediates (e.g., carbenium ions) from acid sites can be essentially accelerated by the highly active dehydrogenation/hydrogenation component via rapidly displacing the carbenium ions from the acid sites through competitive adsorption/desorption (so called Ideal hydrocracking mechanism, Weitkamp, 2012) resulting in the higher reaction rate on the precious metal cation modified ZSM-5, compared to HZSM-5. Therefore, it can be summarized that both acid sites and Ir sites were active sites for hydrocracking of HDPE. For Ir@ZSM-5 catalysts, as trends shown in FIG. 5d, the specific reaction rates of HDPE decomposition were positively proportional to the acid densities on the catalysts, whereas inversely proportional to the trend of iridium loadings. Moreover, the acid sites were responsible for C—C bond cleavage, and Ir site was reported to be active for dehydrogenation/hydrogenation reaction. Thereby, it can be concluded that C—C scission was a rate-limitation step for the hydrocracking of HDPE. The phenomena that the specific rate of HDPE conversion decreased with the addition of Ir loading can be explained by the fact that the interaction between Ir site and $H_2$ was weakened with the aggregation of Ir sites, which also is consistent with the literature, Lin et al, 2011; Wang et al., 2017, which further illustrates that the single-atom catalyst played a key role in the HDPE cracking reaction. Xiong et al., 2017.

To illustrate the effect of MFI pores of ZMS-5 on the selectivity of products (i.e., the shape-selectivity feature of ZSM-5), the catalytic hydrocracking of HDPE over 0.05% Ir@ZSM-5 and 0.05% Ir@Aluminosilicate were tested (FIG. 5e). Obviously, when iridium loading was the same, the pore structure of HZSM-5 was favorable for the generation of $C_8$ products, which accounted for 58.1% of the products, while the Ir@Aluminosilicate with the same Si/Al ratio without pore structure obtained 64.4% of $C_5$ in the products. Taking the shape-selectivity effect of MFI channels into consideration, this is mainly attributed to $C_5$ intermediates/products generated from the C—C bond scission at external surface entered into the channels of ZSM-5, and underwent a number of conversions, such as skeletal rearrangements, isomerization, aromatization etc. processes and formed the products dominated with $C_8$ hydrocarbons. Herein, the aromatization may play a dominant effect during this process, leading to the high selectivity of xylene in the $C_8$ hydrocarbons. The control experiments of n-pentane conversion and n-pentane+Benzene conversion over 0.05% Ir@ZSM-5 produced xylene (FIG. 17), especially 99.4% of xylene was found in the latter reaction, validating the significance of aromatization.

The similar comparison also was found over pure ZSM-5 and aluminosilicate in FIG. 18a, further corroborated that the essential effect of MFI channels on the high selectivity of $C_8$ for the overall reaction. Additionally, the $NH_3$-TPD results of ZSM-5, aluminosilicate, 0.05% Ir@ZSM-5 and 0.05% Ir@Aluminosilicate were shown in FIG. 18b and FIG. 19. The results showed that the acid densities of aluminosilicate with or without Ir loading were lower than zeolite samples. It is easy to understand that the surface areas of aluminosilicate samples without pores structure were lower than that of zeolite samples. There were anyway some aluminum sites not accessible.

1.3.5 Techno-economic Assessment.

To investigate the industrial applicability and economic feasibility of the proposed HDPE treatment system, ASPEN Plus and ASPEN HYSYS were utilized to simulate the hydrocracking of HDPE catalyzed by 0.05% Ir@ZSM-5, but conducted in fluidized reactor with the HDPE capacities ranging from 7,000 to 13,000 metric tons year$^{-1}$ which taking the scaling-up into account, and the techno-economic assessment (TEA) was developed to evaluate the profitability of each HDPE feeding rate. Due to the unknown specific reaction kinetics parameters and stoichiometry of HDPE hydrocracking, an Aspen HYSYS yield shift reactor with fluidized process was proposed to simulate the fluidized-bed reactor which only requires the yields of products derived from the fix-bed reactor. Fivga and Dimitriou, 2018. FIG. 20 elaborated the production distributions simulated from the yield shift reactor, confirmed the consistency with the results obtained in the fix-bed reactor, rationalized the upgrading from fixed-bed reactor to a fluidized-bed reactor.

In the simulation process (FIG. 6a), the HDPE hydrocracking system consisted of a hydrocracking reactor unit, a heat exchanger network, and a gas/liquid separation and product collection system. The hydrocracking unit operated at 400° C. After reaction, the remaining hydrogen was recycled with the carrier gas of $N_2$, flowed back to hydrocracking reactor via mixing with the feeding $H_2/N_2$ stream. A heat exchanger unit was integrated and recollected the energy releasing from the separation system, further heated the $H_2/N_2$ stream. The mass balance and energy balance for the overall process were present in FIG. 21 by taking the HDPE feeding rate of 8,500 metric ton per year as an example. FIG. 6b exhibited the dependences of heat duty and energy efficiency on HDPE feeding capacity. It is apparent that higher HDPE feeding rate demanded more energy. For instance, the heat duty with the rate of 8500 metric ton per year was 324 kW. The variation of overall energy efficiency, however, is indistinct and kept at around 97.5% for different HDPE feed capacity.

Figure 22:
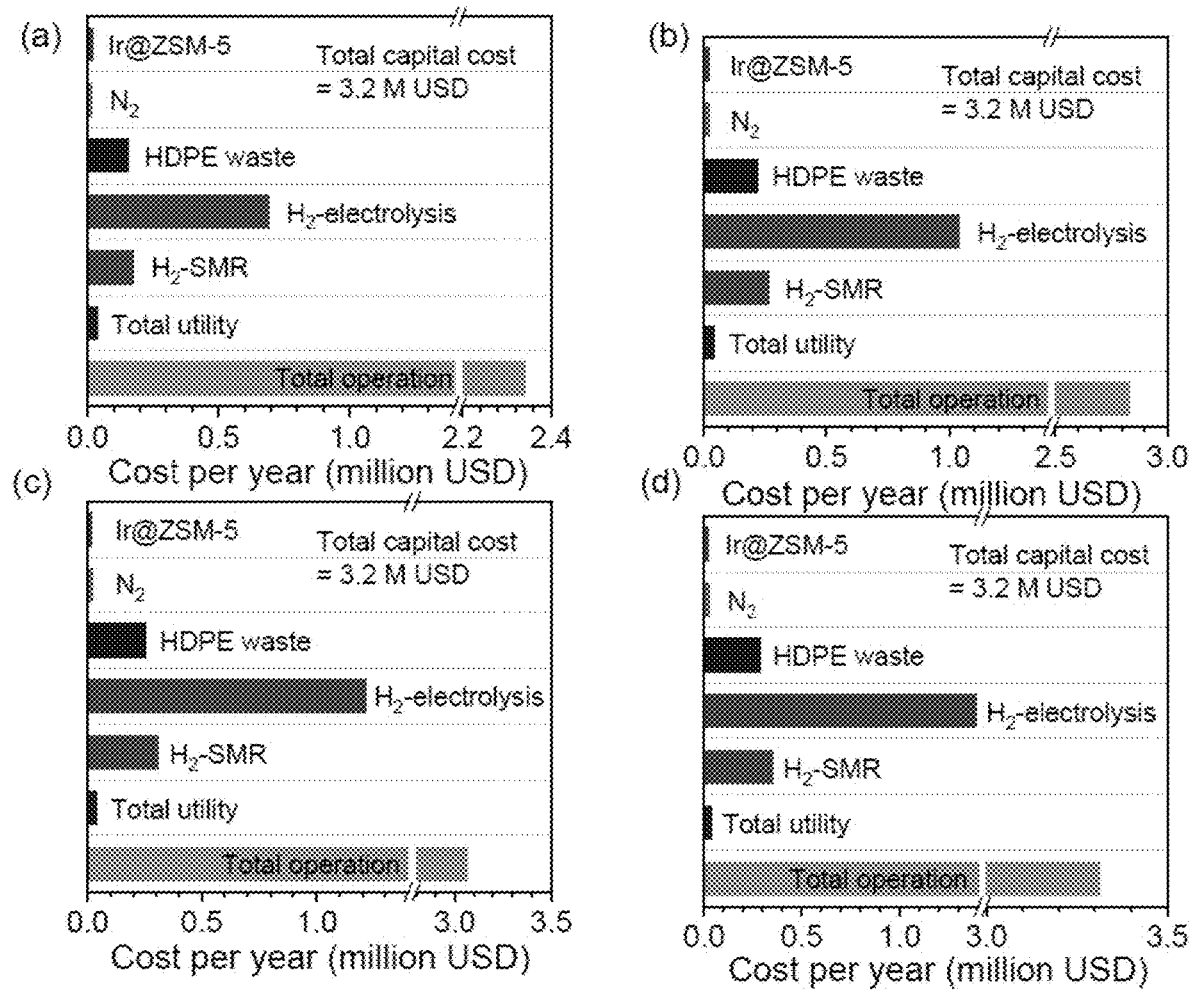
Figure 23:
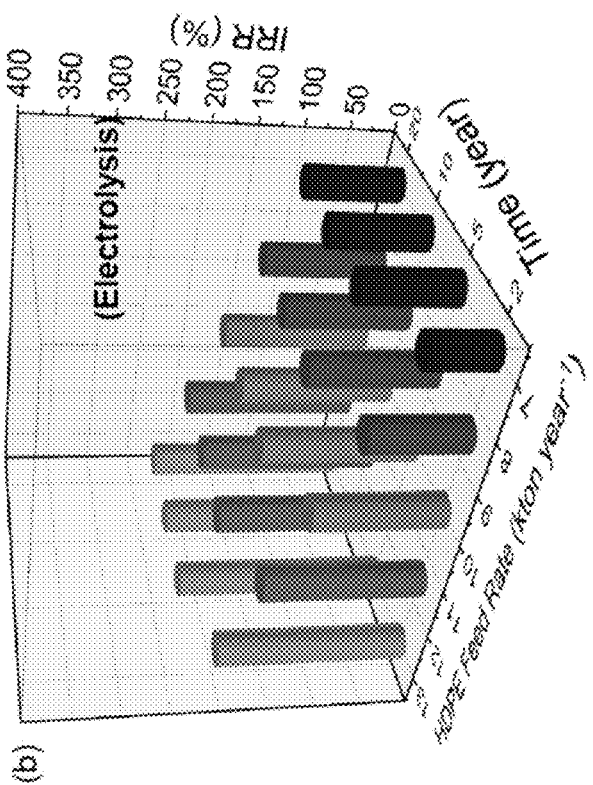
Figure 23:
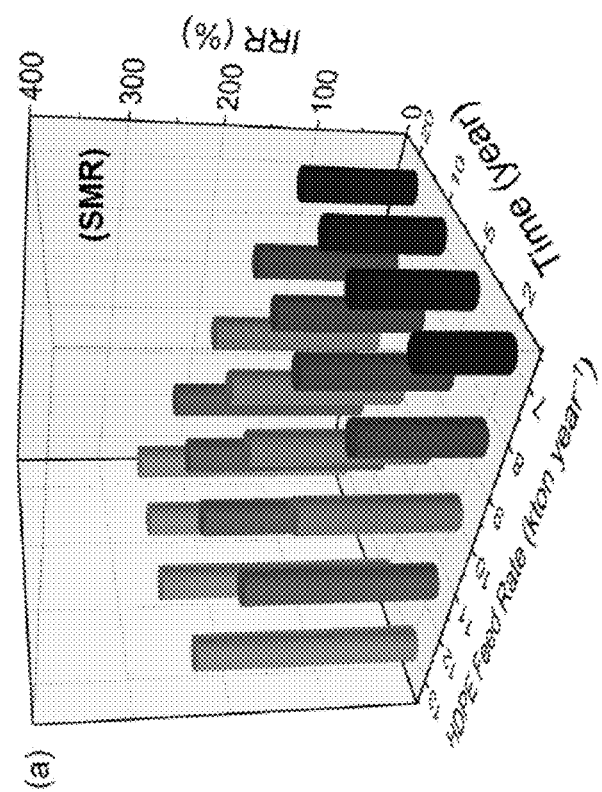

The economics also were assessed by ASPEN Process Economic Analyzer. Table 1 and FIG. 6c (HDPE feeding capacity=8500 ton per year) and FIG. 22 summarized and compared the expenses of operation, utility, and each raw material each year. The total capital cost also was provided. Herein, the total capital cost and the utilities cost did not change too much along with HDPE feeding rate. Due to the labor and maintenance are included in the operation, the cost increase with HDPE feeding rate. Comparing the cost for other raw materials, it is noted that the cost for $H_2$ is more expensive. Thus, two sources for the supply of $H_2$ are suggested as steam methane reforming (SMR) and the electrolysis of water (electrolysis). The cost of later was nearly four times that of the former, which inevitably lowered the net present value (NPV) and prolonged the payback period when generating $H_2$ by electrolysis. Hereby, the Net Present Value (NPV) for each HDPE feeding capacity was calculated at the same discount rate of 10% (FIGS. 6d and 6e), and the Investors' Rate of Return (IRR) was calculated accordingly in FIG. 23. For instance, when the $H_2$ generated from SMR and HDPE is fed in with the rate of 8,500 metric ton per year, the NPV of the system after 2 years is projected to be $5.5 MM (FIG. 12d), which corresponds to the IRR of 125% (FIG. 23). Alternatively, for the $H_2$ obtained from electrolysis of water, when HDPE is fed in with the rate of 8,500 metric ton per year of HDPE feed, the NPV of the system after 2 years is expected to be $4.4 MM (FIG. 12e), which corresponds to the IRR of 102.7% (FIG. 23). The comparison of economics with SMR and electrolysis indicates that due to the higher raw materials costs, the payback period is prolonged, and IRR is lower in the case of electrolysis-generated $H_2$. Although in the short term, however, the economic profits for the process where the $H_2$ generated from SMR are higher, electrolysis of water to produce $H_2$ for the hydrocracking exhibit environmentally benign benefits and promotes the sustainability for environment because of zero $CO_2$ emission. In addition, the comparison in FIG. 6f corroborated that the energy efficiency (approximately 97.4%) and profitability (~1K USD by upcycling per kg of HDPE waste) of the presently disclosed work is superior to the pyrolysis, Fivga and Dimitriou, 2018; Gracida-Alvarez et al., 2019a, and hydrocracking, Al-Salem et al., 2014, processes reported in the literature, which benefited from the higher heating value of products dominated with $C_5$-$C_{10}$ hydrocarbons (>80%), and containing more valuable $C_8$ products (>58%).

Furthermore, carbon footprints are needed in the consideration of the actual feasibility of our system. Clean and renewable energy sources can be applied in our system to decrease $CO_2$ emission and reduce carbon footprints. Solar, wind and hydro power, for instance, can be utilized to provide energy supply to our system, including the electrolysis of water to supply $H_2$. Gracida-Alvarez et al., 2019b. With the incorporation of clean and renewable energy sources, the negative environmental impacts can be greatly mitigated, even with negative $CO_2$ emission, which is a solid accomplishment in sustainable development of our industry and society.

1.4 Summary

A series of Ir@ZSM-5 catalysts with the loading of 0.05-1% were synthesized and evaluated by catalytic hydrocracking of high density polyethylene (HDPE). Two configurations of packing HDPE and catalysts were carried out: well mixing and layer. $C_2$-$C_7$ hydrocarbons dominated with approximately 52% of $C_5$ hydrocarbons were obtained in the former, while $C_2$-$C_{10}$ hydrocarbons populated with approximately 58% of $C_8$ hydrocarbons were derived in the latter by taking advantage of tandem reaction, herein, $C_8$ species were mainly xylene, the selectivity of which was approximately 96%. Kinetic studies revealed that both acid sites and single Ir sites were involved in the hydrocracking of HDPE. Acid sites were responsible for C—C scission, which was the rate-limitation step, which could be accelerated by dehydrogenation/hydrogenation catalyzed by single Ir sites. The upgrading of $C_8$ from $C_5$ hydrocarbons occurred through intrinsic channels of ZSM-5. The good durability of Ir@ZSM-5 also was demonstrated, indicating the great potential for practical implementations. Based on the techno-economic assessment, our HDPE hydrocracking system showed economic advantages in term of short payback periods and high IRR, and the system can claim sustainability with clean energy sources.

Example 2

Efficient and Selective Conversion of High Density Polyethylene into Valuable Hydrocarbons 2.1 Materials and Methods 2.1.1 Chemicals.

Iridium(III) chloride hydrate (>99.99%), sands, white quartz (≥99.995% trace metals basis), aluminum nitrate nonahydrate (99.997% trace metals basis), sodium metasilicate pentahydrate (≥95.0%), ammonia solution (28-30%), hydrogen chloride solution (32 wt. % in $H_2O$) were purchased from Sigma Aldrich, the quartz sands were washed by 5 mol $L^{-1}$ hydrogen chloride, calcined at 500° C. for 2 h in the air to burn the impurities on the surface, and further sieved out the particles with 40-60 mesh. $NH_4$-ZSM-5, with Si:Al ratios of 11.5 was purchased from Zeolyst International. HDPE pellets were purchased from Eastchem. Deionized water (18.2 MΩ) was collected from an ELGA PURELAB flex apparatus.

2.1.2. Catalyst Preparation.

Four Ir@ZSM-5 catalysts with different nominal Ir loading (0.05 wt %, 0.25 wt %, 0.5 wt %, 1 wt %) were synthesized through a method integrating vacuum pumping and wet impregnation of aqueous solution containing certain amount of Iridium(III) chloride hydrate at room temperature. Before the introduction of $Ir^{3+}$, $NH_4ZSM$-5 with a Si/Al ratio of 11.5 was calcined in air at 450° C. for 5 h to obtain HZSM-5 as the precursor. Typically, 1 g of H-ZSM-5 was placed in a 50-mL three-port flask. The three ports were sealed with two rubber stoppers. One port was connected to a vacuum pump. Before injection of $IrCl_3$ solution, air in the flask containing 1 g H-ZSM-5 was purged for 3-5 h by a vacuum pump, meanwhile the H-ZSM-5 powder was stirred at high temperature (ca. 200° C.), during this process, to remove the impurities (e.g., $H_2O$) from the channels of HZSM-5. Then, the flask was cooled down to room temperature, $IrCl_3$ aqueous solution with different $Ir^{3+}$ concentrations were added to the HZSM-5, which had been pumped for 3-5 h. The injection needle quickly reached the powder, buried in the middle of H-ZSM-5 powder and injected instantly. During the injection, the H-ZSM-5 should be continuously stirred.

After the introduction of $Ir^{3+}$, the samples were further stirred for another 3-5 h under the vacuum at room temperature. Then the $H_2O$ in the above slurry was removed by freeze-drying ($H_2O$ sublimation), meanwhile avoiding the agglomeration of Ir. To further wash the Iridium species, which were not ion-exchanged and may be potentially aggregated during following calcination process, an additional washing and filtration step was applied. In this step, the zeolite was washed with hot deionized water, filtered and then dried in a vacuum oven at room temperature overnight. At last, the samples were calcined in air at 550° C. for 3 h.

2.1.3. Characterization.

Inductively coupled plasma-mass spectroscopy (ICP-MS) analysis was carried out using a PerkinElmer Elan DRC II Quadrupole system, for which the solutions were prepared by digesting the catalysts in aqua regia and aqueous HF followed by dilution with 2% hydrochloric acid (HCl). The microstructure and morphology of the H-ZSM-5 and Ir@ZSM-5 samples were characterized by using scanning electron microscopy (SEM, Hitachi SU-70 FEG-SEM at 10 kV) and transmission electron microscopy (TEM, JEOL 2100F FEG TEM/STEM operated at 200 kV) imaging. The X-ray Absorption Spectroscopy measurement at the Ir L3-edge was performed at the Advanced Photon Source (APS) on the bending-magnet beamline 9-BM-B with an electron energy of 7 GeV and average current of 100 mA. The radiation was monochromatized by a Si (111) double-crystal monochromator. Harmonic rejection was accomplished with a Harmonic rejection mirror. All spectra were collected in fluorescence mode by a Vortex Silicon Drift Detector. XAS data reduction and analysis were processed by Athena and Artemis software. The EXAFS coordination parameters were obtained by fitting in k-space of the Fourier transform data with k=3.0-12.0 Å-1. FTIR spectra for CO adsorption were recorded on a Nicolet 6700 spectrometer equipped with a mercury cadmium telluride (MCT) detector cooled by liquid $N_2$. The in situ cell was fitted with ZnS windows and a heating cartridge. Before CO adsorption, samples were evacuated at 200° C. for 2 h, and then cooled to 25° C. for CO adsorption. 5% CO/He was introduced into the DRIFTS cell at a flow rate of 30 ml $min^{-1}$. This was followed by a He purge at a flow rate of 30 ml $min^{-1}$ to remove gas-phase CO from the cell and physical CO on the surface of the samples before DRIFTS measurements. Spectra were collected at 25° C. with a resolution of 4 cm-1 and accumulation of 100 scans for each sample.

The surface acidity was measured by temperature-programmed desorption of $NH_3$ ($NH_3$-TPD) on a Micromeritics AutoChem II 2920 chemisorption analyzer. Typically, 200 mg of Ir@ZSM-5 catalysts (40-60 mesh) were loaded in a U-type sample tube preheated at 500° C. for 2 h, and then cooled to 120° C. in flowing helium for $NH_3$ adsorption. At this temperature, sufficient pulses of ammonia were injected until adsorption saturation occurred, followed by purging with helium for 2 h. The temperature was then raised from 120° C. to 600° C. at a rate of 10° C. $min^{-1}$, and the desorbed $NH_3$ was monitored by TCD, and the TCD signal was calibrated by the standard $NH_3$ gas tanks (He as the balance gas).

Temperature-programmed reduction (TPR) profiles were obtained on a Micromeritics AutoChem II 2920 apparatus. Typically, 200 mg of Ir@ZSM-5 catalysts were loaded in a U-type sample tube. The samples (40-60 mesh) were pre-treated in He at 500° C. for 2 h to remove impurities on surface, and then cooled to 40° C. in He. Then the samples were reduced by a $H_2$/Ar mixture (10 vol. % $H_2$) flowing at 30 mL $min^1$ and heated with at a ramping rate of 10° C./min to a final temperature of 400° C. The consumed $H_2$ was monitored by TCD, and the TCD signal was calibrated by the standard $H_2$ gas tanks (Ar as the balance gas).

2.1.4. Catalytic Studies.

The catalytic hydrocracking of high-density polyethylene (HDPE) was conducted in a fixed-bed flow reactor at atmospheric pressure. The mixture of 160-180 mg HDPE pellets+200 mg acid washed quartz sands (40-60 mesh)+50 mg Catalyst (40-60 mesh) were loaded into a microflow quartz reactor (7 mm i.d.), which packed with two different configuration: (1) well mixing the HDPE, sands and catalyst (2) loading the HDPE (top), sands (middle) and catalyst (bottom) layer-by-layer. Then heated to different reaction temperature (250° C., 300° C., 350° C. and 400° C.) at a rate of 5° C./min under He (30 mL/min), and held at each temperature for 2.5 to 4 h until no products can be online detected by a gas chromatograph (GC-2010 plus, Shimadzu) equipped with a SH-Rt-Q-BOND column and a BID detector. A cool trap was set in between the reactor and GC to condense the products with high boiling points (BP), which can be quantified by NMR, and the products with low BP were detected by GC. After reaction, the residuals were treated by toluene for 30 mins, then filtered at 160° C. The solids were vacuum dried overnight, then calcined in air, the effluents were measured by a multigas analyzer (MultiGas 2030, MKS) to determine the amount of deposited coke in the catalysts. On the other side, for the toluene solution after filtration, the wax was precipitated gradually when the temperature of toluene cooled down to room temperature, which was weighed by precious mass balance after drying toluene out.

2.2 Techno-Economic Assessment

2.2.1 Process Description.

The HDPE treatment system consists of a hydrocracking reactor unit, a heat exchanger network, and a gas/liquid product separation, collection system. The yield shift reactor in ASPEN HYSYS software was used as the simulation model to develop the full stream tables of the HDPE hydrocracking reactions, in which mass balances, heat duty and utilities also were obtained. The PENG-ROB property method was selected for the unit operations to acquire accurate hydrocarbon and light gas results.

The HDPE plastic waste feedstock was modulated with an elemental composition of 85 wt % carbon and 15 wt % of hydrogen on a dry ash free basis. The heating value (HV) of the feedstock is calculated in the following equation:

$$HV_{Dry}\left(\frac{MJ}{kg}\right) = 0.3491*C + 1.1783*H + 0.1005*S -$$
$$0.1034*O - 0.015*N - 0.0211*A - 2.442*8.936*\frac{H}{100}$$

where C, H, S, O, N and A are mass percentages on dry basis of carbon, hydrogen, sulfur, oxygen, nitrogen and ash contents in the feedstock. The fuel energy efficiency (FEE) of each case is calculated by the following formula:

$$FEE = \frac{\sum_{i=C1\sim C10}^{C1\sim C10}(LHV_{Dry} \text{ of the } ith \text{ product} * ith \text{ product mass flow rate})}{LHV_{Dry} \text{ of the HDPE feedstock} * HDPE \text{ feedstock mass flow rate}} * 100\%$$

where the energy of the hydrocracking product is divided by the energy content of the HDPE feedstock. The total energy efficiency (TEE) of each case can be obtained by:

$$TEE = \frac{LHV_{Dry} \text{ of products}}{LHV_{Dry} \text{ of HDPE} + LHV_{Dry} \text{ of 5\% H}_2/N_2 \text{ gas+Heat duty}} * 100\%$$

The hydrocracking unit operates at 400° C. with the inlet HDPE feeds ranging from 7000 metric ton per year to 13000 metric ton per year. The inlet gas stream into the hydrocracking reactor is 5% $H_2/N_2$ gas feed ranging from 2523 metric ton per year to 5045 metric ton per year. The outlet stream exits the hydrocracking reactor at 400° C. with mass flow rates ranging from 9271 metric ton per year to 17541 metric ton per year. The outlet stream is then sent to a gas/liquid separation system for phase separation and product collection. The gas/liquid separation system has an integration of a heat exchanger network. The heat released from the gas/liquid separation process is utilized by the heat exchanger network to heat up the incoming 5% $H_2/N_2$ gas from gas storage to 400° C. Additionally, after the gas/liquid separation, the remaining $H_2/N_2$ gas in the final product stream is recovered and merged with incoming 5% $H_2/N_2$ gas from gas storage in the heat exchanger network. Thus, unreacted 5% $H_2/N_2$ gas recovered in the product stream can be recycled back into the hydrocracking reactor and thereby decrease the demand for 5% $H_2/N_2$ gas feed from gas storage. Furthermore, the final product stream consists of $C_2$ products (221 metric ton per year to 378 metric ton per year), $C_3$ products (158 metric ton per year to 315 metric ton per year), $C_4$ products (126 metric ton per year to 221 metric ton per year), $C_5$ products (725 metric ton per year to 1356 metric ton per year), $C_6$ products (95 metric ton per year to 189 metric ton per year), $C_7$ products (221 metric ton per year to 410 metric ton per year), $C_8$ products (4857 metric ton per year to 9019 metric ton per year), $C_9$ products (315 metric ton per year to 599 metric ton per year), $C_{10}$ products (252 metric ton per year to 505 metric ton per year). In the term of energy, the heating value (HV) of the HDPE feed stock varies from 9783.2 kW to 18168.8 kW depending on the different HDPE feeding rate. The HV of the total product varies from 9846.54 kW to 18286.42 kW accordingly.

2.2.2. Cost Estimation Methodology.

The total capital cost, the total operating cost and utilities cost of the TEA model are obtained from ASPEN Process Economic Analyzer. The raw materials cost and product sales are retrieved based on current market prices (Table S1). Estimation of the total capital cost, the total operation cost and the utilities cost are acquired from ASPEN Process Economic Analyzer. Current market prices of species involved in the hydrocracking process are retrieved from business reports and government agency data. The initial investment is the summation of the total capital cost and the total operation costs before operation, and the initial investment is not counted in the annual cash flow calculation.

TABLE S1

The parameters for Aspen Process Economic Analyzer (APEA).

| General Techno-Economic Assessment Parameters | |
| --- | --- |
| Plant life | 20 years |
| Plant annual operating hours | 8760 hours/year |
| Interest Rate | 10% |
| Total Capital Cost | $3,216,570-$3,217,150 |
| Total Operating Cost | $2,340,260-$3,312,740/year |
| Total Raw Materials Cost (SMR-$H_2$)[a] | $1,283,290-$2,183,730/year |
| Total Raw Materials Cost (Electrolysis-$H_2$)[a] | $1,801,742-$3,220,634/year |
| Total Product Sales[a] | $6,653,440-$12,353,200/year |
| Total Utilities Cost[a] | $39,892/year |
| Average Product Unit Sale Price | |
| C2-C4 Product Average Unit Price[a] | $1.40/kg |
| C5-C10 Product Average Unit Price[a] | $0.50/kg |

[a]Pricing information reported in latest business and government agency reports from Secondary Materials Pricing (SMP) Index, National Renewable Energy Laboratory (NREL) and U.S. Energy Information Administration (EIA).

The annual cash flow calculation can be expressed as:

Annual Cash Flow=Product Sale−Raw Materials Cost−Operation Cost−Utilities

The net present value (NPV) is calculated by the following equation1 with a discount rate of 10%:

$$\text{Net Present Value} = \sum_{t=0}^{n}\frac{\text{Annual Cash Flow}}{(1+i)^t} - \text{Intitial Investment}$$

where i is the discount rate, and t is the number of time periods. The internal rate of return (IRR) can be calculated by as provided in Hernandez et al., 2018:

$$0 = \text{Net Present Value} = \sum_{t=0}^{n}\frac{\text{Annual Cash Flow}}{(1+IRR)^t} - \text{Intitial Investment}$$

where solution IRR and t are the investors' rate of return and the payback period respectively. It should be acknowledged that the current TEA model did not account for inflation rates, tax rates, labor costs, other overhead operating costs including maintenance costs, and salvage values. The integration of the unaccounted parameters could increase potential costs, which needs further detailed economic analysis.

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Hemandez, P., Oregi, X., Longo, S. and Cellura, M. *Handbook of Energy Efficiency in Buildings: A Life Cycle Approach.* 223-227 (Elsevier Inc., 2018).

Rahimi, A. and Garcia, J. M. Chemical recycling of waste plastics for new materials production. *Nat Rev Chem* 1, 1-11 (2017).

EPA, *Advancing Sustainable Materials Management:* 2017 *Fact Sheet*, https://www.epa.gov/facts-and-figures-about-materials-waste-and-recycling/plastics-material-specific-data (2019).

Aguado, J., Serrano, D. P. and Escola, J. M. Fuels from Waste Plastics by Thermal and Catalytic Processes: A Review. *Ind Eng Chem Res* 47, 7982-7992 (2008).

Kunwar, B., Cheng, H. N., Chandrashekaran, S. R. and Sharma, B. K. Plastics to fuel: a review. *Renew Sust Energ Rev* 54, 421-428 (2016).

Serrano, D. P., Aguado, J. and Escola, J. M. Developing Advanced Catalysts for the Conversion of Polyolefinic Waste Plastics into Fuels and Chemicals. *Acs Catal* 2, 1924-1941 (2012).

Zhang, M. M., Buekens, A., Jiang, X. G. and Li, X. D. Dioxins and polyvinylchloride in combustion and fires. *Waste Manage Res* 33, 630-643 (2015).

Jia, X. Q., Qin, C., Friedberger, T., Guan, Z. B. and Huang, Z. Efficient and selective degradation of polyethylenes into liquid fuels and waxes under mild conditions. *Sci Adv* 2 (2016).

Kaminsky, W., Mennerich, C. and Zhang, Z. Feedstock recycling of synthetic and natural rubber by pyrolysis in a fluidized bed. *J Anal Appl Pyrol* 85, 334-337 (2009).

Celik, G. et al. Upcycling Single-Use Polyethylene into High-Quality Liquid Products. *Acs Central Sci* 5, 1795-1803 (2019).

Achilias, D. S., Roupakias, C., Megalokonomos, P., Lappas, A. A. and Antonakou, E. V. Chemical recycling of plastic wastes made from polyethylene (LDPE and HDPE) and polypropylene (PP). *J Hazard Mater* 149, 536-542 (2007).

Wong, S., Ngadi, N., Abdullah, T. A. T. and Inuwa, I. M. Catalytic Cracking of LDPE Dissolved in Benzene Using Nickel-Impregnated Zeolites. *Ind Eng Chem Res* 55, 2543-2555 (2016).

Zhang, Z. et al. Recovering waste plastics using shape-selective nano-scale reactors as catalysts. *Nat Sustain* 2, 39-42 (2019).

Yang, D. et al. Metal-Organic Framework Nodes as Nearly Ideal Supports for Molecular Catalysts: NU-1000-and UiO-66-Supported Iridium Complexes. *J Am Chem Soc* 137, 7391-7396 (2015).

Weitkamp, J. Catalytic Hydrocracking-Mechanisms and Versatility of the Process. *Chemcatchem* 4, 292-306 (2012).

Miskolczi, N., Angyal, A., Bartha, L. and Valkai, I. Fuels by pyrolysis of waste plastics from agricultural and packaging sectors in a pilot scale reactor. *Fuel Process Technol* 90, 1032-1040 (2009).

Castano, P. et al. Insights into the coke deposited on HZSM-5, H beta and HY zeolites during the cracking of polyethylene. *Appl Catal B-Environ* 104, 91-100 (2011).

Elordi, G., Olazar, M., Lopez, G., Castano, P. and Bilbao, J. Role of pore structure in the deactivation of zeolites (HZSM-5, H beta and HY) by coke in the pyrolysis of polyethylene in a conical spouted bed reactor. *Appl Catal B-Environ* 102, 224-231 (2011).

Guo, X. G. et al. Direct, Nonoxidative Conversion of Methane to Ethylene, Aromatics, and Hydrogen. *Science* 344, 616-619 (2014).

Xie, P. F. et al. Nanoceria-Supported Single-Atom Platinum Catalysts for Direct Methane Conversion. *Acs Catal* 8, 4044-4048 (2018).

Kumara, S., Panda, A. K. and Singha, R. K. A review on tertiary recycling of high-density polyethylene to fuel. *Resour Conserv Recy* 55, 893-910 (2011).

Ibanez, M. et al. Identification of the coke deposited on an HZSM-5 zeolite catalyst during the sequenced pyrolysis-cracking of HDPE. *Appl Catal B-Environ* 148, 436-445 (2014).

Songip, A. R., Masuda, T., Kuwahara, H. and Hashimoto, K. Test to Screen Catalysts for Reforming Heavy Oil from Waste Plastics. *Appl Catal B-Environ* 2, 153-164 (1993).

Mills, G. A., Heinemann, H., Milliken, T. H. and Oblad, A. G. Houdriforming Reactions—Catalytic Mechanism. *Ind Eng Chem* 45, 134-137 (1953).

Weisz, P. B. and Swegler, E. W. Stepwise Reaction on Separate Catalytic Centers—Isomerization of Saturated Hydrocarbons. *Science* 126, 31-32 (1957).

Rahimi, N. and Karimzadeh, R. Catalytic cracking of hydrocarbons over modified ZSM-5 zeolites to produce light olefins: A review. *Appl Catal a-Gen* 398, 1-17 (2011).

Verheyen, E. et al. Molecular shape-selectivity of MFI zeolite nanosheets in n-decane isomerization and hydrocracking. *J Catal* 300, 70-80 (2013).

Yu, Y. Q. et al. The role of shape selectivity in catalytic fast pyrolysis of lignin with zeolite catalysts. *Appl Catal a-Gen* 447, 115-123 (2012).

Al-Dughaither, A. S. and de Lasa, H. HZSM-5 Zeolites with Different $SiO_2/Al_2O_3$ Ratios. Characterization and $NH_3$ Desorption Kinetics. *Ind Eng Chem Res* 53, 15303-15316 (2014).

Lonyi, F. and Valyon, J. On the interpretation of the $NH_3$-TPD patterns of H-ZSM-5 and H-mordenite. *Micropor Mesopor Mat* 47, 293-301 (2001).

Yin, X. L. et al. $NH_3$ adsorption on the Bronsted and Lewis acid sites of V2O5(010): A periodic density functional study. *J Phys Chem B* 103, 4701-4706 (1999).

Lin, J. et al. In Situ Calorimetric Study: Structural Effects on Adsorption and Catalytic Performances for CO Oxidation over Ir-in-$CeO_2$ and Ir-on-$CeO_2$ Catalysts. *J Phys Chem C* 115, 16509-16517 (2011).

Wang, F. G. et al. Thermally stable Ir/Ce0.9La0.1$O_2$ catalyst for high temperature methane dry reforming reaction. *Nano Res* 10, 364-380 (2017).

Coonradt, H. L. and Garwood, W. E. Mechanism of Hydrocracking—Reactions of Paraffins+Olefins. *Ind Eng Chem Proc Dd* 3, 38-& (1964).

Xiong, H. F. et al. Thermally Stable and Regenerable Platinum-Tin Clusters for Propane Dehydrogenation Prepared by Atom Trapping on Ceria. *Angew Chem Int Edit* 56, 8986-8991 (2017).

Fivga, A. and Dimitriou, I. Pyrolysis of plastic waste for production of heavy fuel substitute: A techno-economic assessment. *Energy* 149, 865-874 (2018).

Gracida-Alvarez, U. R., Winjobi, O., Sacramento-Rivera, J. C. and Shonnard, D. R. System Analyses of High-Value Chemicals and Fuels from a Waste High-Density Polyethylene Refinery. Part 1: Conceptual Design and Techno-Economic Assessment. *Acs Sustain Chem Eng* 7, 18254-18266 (2019).

Al-Salem, S. M., Papageorgiou, L. G. and Lettieri, P. Techno-economic assessment of thermo-chemical treatment (TCT) units in the Greater London area. *Chem Eng J* 248, 253-263 (2014).

Gracida-Alvarez, U. R., Winjobi, O., Sacramento-Rivero, J. C. and Shonnard, D. R. System Analyses of High-Value Chemicals and Fuels from a Waste High-Density Polyethylene Refinery. Part 2: Carbon Footprint Analysis and Regional Electricity Effects. *Acs Sustain Chem Eng* 7, 18267-18278 (2019).

U.S. Pat. No. 10,239,049 to Gaffney for Alloyed Zeolite Catalyst Component, Method for Making and Catalytic Application Thereof, issued Mar. 26, 2019.

U.S. Pat. No. 9,404,045 to Gaffney for Alloyed Zeolite Catalyst Component, Method for Making and Catalytic Application Thereof, issued Aug. 2, 2016.

U.S. Patent Application Publication No. 20200078767 to Jantharasuk et al, for Hydrocarbon Conversion Catalyst, published Mar. 12, 2020.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A catalyst comprising iridium and an HZSM-5 zeolite, wherein the catalyst comprises one or more single-atom iridium sites confined in the HZSM-5 zeolite, and wherein the catalyst comprises an iridium loading of between about 0.05 wt % iridium to about 0.25 wt % of iridium.

2. The catalyst of claim 1, wherein the catalyst comprises an iridium loading selected from the group consisting of 0.05 wt % and 0.25 wt %.

3. The catalyst of claim 1, wherein the catalyst is substantially free of iridium clusters or iridium ensembles.

4. The catalyst of claim 1, wherein the catalyst is substantially free of iridium-iridium metal bonds.

5. The catalyst of claim 1, wherein the iridium bonds with one or more oxygen atoms in a lattice comprising the HZSM-5 zeolite.

6. The catalyst of claim 5, wherein the catalyst has an average coordination number of oxygen atoms to iridium of about 4.21±0.47.

7. The catalyst of claim 1, wherein the HZSM-5 zeolite comprises a Si/Al ratio of about 11.5.

8. A process for converting a plastic into one or more lower-molecular weight hydrocarbons, the process comprising:
(a) providing a metal-exchanged zeolite catalyst;
(b) contacting the plastic and metal-exchanged zeolite catalyst in a fixed-bed flow reactor in a stream of hydrogen/nitrogen gas wherein the plastic and the metal-exchanged zeolite catalyst are packed in one of a (i) mixed configuration and the lower-molecular weight hydrocarbons comprise one or more $C_2$-$C_7$ hydrocarbons; or (ii) layer-by-layer configuration and the lower-molecular weight hydrocarbons comprise one or more $C_2$-$C_{10}$ hydrocarbons; and
(c) collecting the one or more lower-molecular weight hydrocarbons.

9. The process of claim 8, wherein the plastic comprises a thermoplastic.

10. The process of claim 9, wherein the thermoplastic is selected from the group consisting of high-density polyethylene (HDPE), low-density polyethylene (LDPE), polypropylene (PP), polystyrene (PS), polyvinyl chloride (PVC), polyethylene terephthalate (PET), and mixtures thereof.

11. The process of claim 8, wherein the metal-exchanged zeolite catalyst comprises a transition metal.

12. The process of claim 11, wherein the transition metal is selected from the group consisting of Ti, V, Cr, Mn, Fe, Co, Ni, Cu, Pt, Pd, Ir, Au, Ag, Ru, Rh, Re, Os, Mo, and W.

13. The process of claim 12, wherein the contacting is conducted at a temperature is from about 350° C. to about 400° C.

14. The process of claim 11, wherein the transition metal is Ir.

15. The process of claim 8, wherein the metal-exchanged zeolite comprises a zeolite selected from the group consisting of clinoptilolite, chabazite, phillipsite, mordenite, analcime, heulandite, natrolite, and stilbite.

16. The process of claim 8, wherein the metal-exchanged zeolite comprises a zeolite selected from the group consisting of ZSM-5, SSZ-13, and mordenite.

17. The process of claim 8, wherein the mixed configuration further comprises quartz sands mixed with the plastic and the metal-exchanged zeolite catalyst.

18. The process of claim 8, wherein the layer-by-layer configuration comprises a layer of plastic and a layer of metal-exchanged zeolite catalyst, wherein the layer of plastic and layer of metal-exchanged zeolite catalyst are separated by a layer of quartz sand.

19. The process of claim 18, wherein the plastic comprises high-density polyethylene (HDPE).

20. The process of claim 8, wherein the layer-by-layer configuration results in a tandem reaction comprising separate pyrolysis of the plastic and catalytic hydrocracking of the plastic.

21. The process of claim 8, wherein the contacting is conducted at a temperature from about 250° C. to about 450° C.

22. The process of claim 8, wherein the contacting is carried out for a time period from about 0.5 hours to about 3 hours.

23. The process of claim 8, wherein the contacting is carried out at atmospheric pressure.

24. The process of claim 8, wherein the one or more $C_2$-$C_7$ hydrocarbons comprise about 45% to about 55% $C_5$ hydrocarbons.

25. The process of claim 8, wherein the one or more $C_2$-$C_{10}$ hydrocarbons comprise about 55% to about 65% $C_8$ hydrocarbons.

26. The process of claim 25, wherein the $C_8$ hydrocarbons comprise about 96% xylene and structural isomers thereof.

27. The process of claim 8, wherein the hydrogen/nitrogen gas comprises about a 5% hydrogen/95% nitrogen mixture.

28. The process of claim 8, further comprising collecting the one or more lower-molecular weight hydrocarbons in a gas/liquid separation unit.

29. The process of claim 28, wherein the gas/liquid separation unit further comprises a heat exchanger network.

30. The process of claim 29, further comprising capturing heat released from the gas/liquid separation unit via heat exchange with the heat exchanger network and an inlet stream of hydrogen gas.

31. The process of claim 8, further comprising capturing residual hydrogen/nitrogen gas and recycling it for reuse in the fixed-bed flow reactor.

32. The process of claim 8, wherein metal-exchanged zeolite catalyst comprises iridium and an HZSM-5 zeolite, wherein the catalyst comprises one or more single-atom iridium sites confined in the HZSM-5 zeolite, and wherein the catalyst comprises an iridium loading of between about 0.05 wt % iridium to about 0.25 wt % of iridium.

* * * * *